US010224083B2

(12) United States Patent
Saito

(10) Patent No.: US 10,224,083 B2
(45) Date of Patent: Mar. 5, 2019

(54) SEMICONDUCTOR DEVICE, AND UNIQUE ID GENERATION METHOD

(71) Applicant: Renesas Electronics Corporation, Tokyo (JP)

(72) Inventor: Tomoya Saito, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/926,672

(22) Filed: Mar. 20, 2018

(65) Prior Publication Data
US 2018/0315463 A1 Nov. 1, 2018

(30) Foreign Application Priority Data

Apr. 26, 2017 (JP) .................................. 2017-087297

(51) Int. Cl.
G11C 16/10 (2006.01)
G11C 16/28 (2006.01)
G11C 8/12 (2006.01)
G11C 7/10 (2006.01)
G06F 12/06 (2006.01)
G11C 8/06 (2006.01)

(52) U.S. Cl.
CPC ............ *G11C 8/12* (2013.01); *G06F 12/0646* (2013.01); *G11C 7/1051* (2013.01); *G11C 8/06* (2013.01)

(58) Field of Classification Search
CPC . G11C 16/10; G11C 11/5642; G11C 11/5628; G11C 16/26; G11C 16/0483; G11C 16/3404; G11C 16/16; G11C 16/12; G11C 7/06; G11C 11/5671; G11C 16/28; G11C 16/3422
See application file for complete search history.

(56) References Cited

U.S. PATENT DOCUMENTS

| 2011/0288807 A1 | 11/2011 | Iwase et al. |
| 2011/0317829 A1 | 12/2011 | Ficke et al. |
| 2015/0278551 A1 | 10/2015 | Iyer et al. |
| 2015/0317257 A1* | 11/2015 | Seol ........................ G06F 21/31 714/760 |
| 2016/0093393 A1* | 3/2016 | Park ........................ G11C 16/26 380/28 |
| 2016/0148679 A1 | 5/2016 | Yoshimoto et al. |

FOREIGN PATENT DOCUMENTS

| JP | 2011-243263 A | 12/2011 |
| JP | 2016-105278 A | 6/2016 |

* cited by examiner

Primary Examiner — Hien Nguyen
(74) Attorney, Agent, or Firm — McGinn IP Law Group, PLLC.

(57) ABSTRACT

A semiconductor device according to one embodiment includes a unique ID generation circuit configured to generate a unique ID using a memory array including a plurality of complementary cells, each of the complementary cells includes first and second memory cells MC1 and MC2. The unique ID generation circuit uses, when data in the complementary cell read out in a first state in which an initial threshold voltage of the first memory cell MC1 has been virtually offset and data in the complementary cell read out in a second state in which an initial threshold voltage of the second memory cell MC2 has been virtually offset coincide with each other, the data in the complementary cell as the unique ID.

16 Claims, 17 Drawing Sheets

SEMICONDUCTOR DEVICE, AND UNIQUE ID GENERATION METHOD

CROSS-REFERENCE TO RELATED APPLICATIONS

This application is based upon and claims the benefit of priority from Japanese patent application No. 2017-087297, filed on Apr. 26, 2017, the disclosure of which is incorporated herein in its entirety by reference.

BACKGROUND

The present disclosure relates to a semiconductor device and a unique ID generation method, and relates to, for example, a semiconductor device and a unique ID generation method capable of generating an ID unique to a device using a PUF technology.

In recent years, security technologies for protecting semiconductor devices such as microcomputers from unauthorized access have become important. One of these security technologies is a Physically Unclonable Function (PUF) technology. The PUF technology includes a technology of generating identifiers (IDs: identification) unique to semiconductor devices using manufacturing variations when the semiconductor devices are manufactured.

Japanese Unexamined Patent Application Publication No. 2011-243263 discloses a technique related to a non-volatile semiconductor memory including a plurality of complementary cells, each of which includes a memory cell MC1 and a memory cell MC2, in which the non-volatile semiconductor memory is capable of holding data in each of the complementary cells using the difference between a threshold voltage of the memory cell MC1 and a threshold voltage of the memory cell MC2.

Japanese Unexamined Patent Application Publication No. 2016-105278 discloses a PUF technology for generating a unique ID using a resistance variable non-volatile memory cell.

SUMMARY

When a unique ID is generated by applying the PUF technology to a non-volatile semiconductor memory disclosed in Japanese Unexamined Patent Application Publication No. 2011-243263, for example, the unique ID can be generated using a difference between an initial threshold voltage of the memory cell MC1 and an initial threshold voltage of the memory cell MC2.

However, since there is a variation between the initial threshold voltages of the memory cells MC1 and MC2, the difference between the initial threshold voltage of the memory cell MC1 and the initial threshold voltage of the memory cell MC2 may become small depending on the combination of the two memory cells MC1 and MC2. In this case, data read out from the complementary cell becomes unstable, which causes a problem that the reliability of the unique ID that has been generated is reduced.

The other problems of the prior art and the novel characteristics of the present disclosure will be made apparent from the descriptions of the specification and the accompanying drawings.

A semiconductor device according to one embodiment includes a unique ID generation circuit configured to generate a unique ID using a memory array including a plurality of complementary cells, each of the complementary cells includes first and second memory cells. The unique ID generation circuit uses, when data in the complementary cell read out in a first state in which an initial threshold voltage of the first memory cell has been virtually offset and data in the complementary cell read out in a second state in which an initial threshold voltage of the second memory cell has been virtually offset coincide with each other, the data in the complementary cell as the unique ID.

According to the embodiment, it is possible to provide a semiconductor device and a unique ID generation method capable of improving the reliability of a unique ID that has been generated.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Hereinafter, with reference to the drawings, a first embodiment will be explained.

Figure 1:
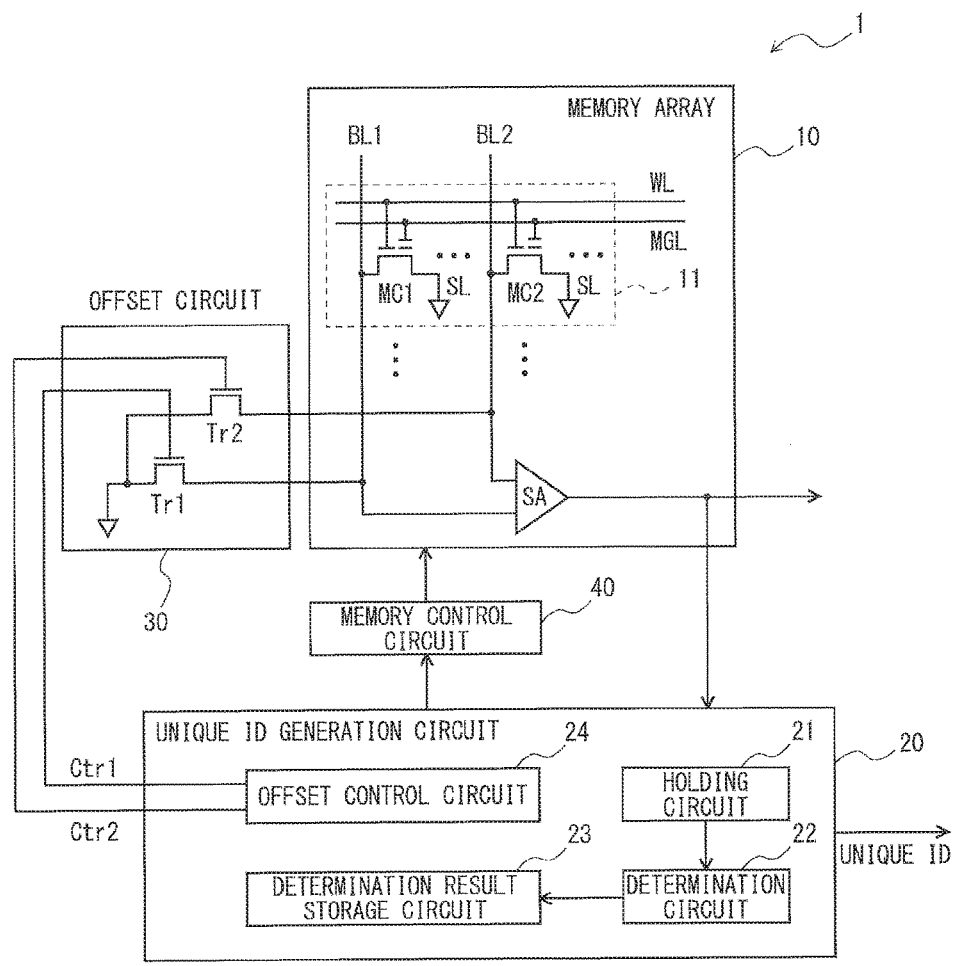
FIG. 1 is a block diagram showing a configuration example of a semiconductor device according to a first embodiment.

FIG. 1 is a block diagram showing a semiconductor device according to the first embodiment. As shown in FIG. 1, a semiconductor device 1 according to this embodiment includes a memory array 10, a unique ID generation circuit 20, an offset circuit 30, and a memory control circuit 40.

The memory array 10 includes a plurality of complementary cells 11, each of the complementary cells 11 including a memory cell MC1 and a memory cell MC2. Each of the complementary cells 11 is configured to be able to hold data using the difference between a threshold voltage Vt1 of the memory cell MC1 and a threshold voltage Vt2 of the memory cell MC2.

Figure 2:
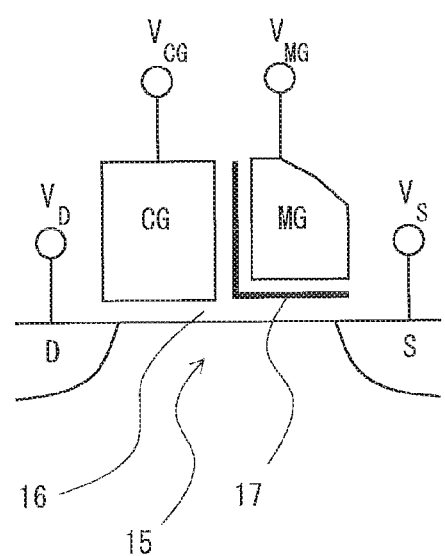
FIG. 2 is a diagram showing a configuration example of a memory cell used in the semiconductor device according to the first embodiment.

FIG. 2 is a diagram showing a configuration example of the memory cells MC1 and MC2 used in the semiconductor device according to this embodiment. As shown in FIG. 2, each of the memory cells MC1 and MC2 includes a source region S, a drain region D, a channel forming region 15 provided between the source region S and the drain region D, and a control gate CG and a memory gate MG arranged on the channel forming region 15 with a gate insulating film 16 interposed therebetween. A charge trapping region 17 such as silicon nitride is arranged between the memory gate MG and the gate insulating film 16. As shown in FIG. 2, the memory cells MC1 and MC2 are split gate flash memory cells (e.g., SG-MONOS).

As shown in FIGS. 1 and 2, the drain regions D of the respective memory cells MC1 and MC2 are connected to bit lines BL1 and BL2, the source regions S thereof are connected to a source line SL, the control gates CG are connected to a word line WL, and the memory gates MG are connected to a memory gate selection line MGL.

In the configuration example of the memory cells MC1 and MC2 shown in FIG. 2, the threshold voltages Vt1 and Vt2 of the memory cells MC1 and MC2 vary depending on the number of electrons trapped by the charge trapping region 17 of the memory cells MC1 and MC2. Specifically, when the number of the electrons trapped by the charge trapping region 17 of the memory cells MC1 and MC2 is large, the threshold voltages Vt1 and Vt2 increase. On the other hand, when the number of the electrons trapped by the charge trapping region 17 of the memory cells MC1 and MC2 is small, the threshold voltages Vt1 and Vt2 decrease.

In order to increase the threshold voltages Vt1 and Vt2 of the memory cells MC1 and MC2, for example, voltage values of the memory cells MC1 and MC2 are set to $V_D$=0 V, $V_{CG}$=1.5 V, $V_{MG}$=10 V, and $V_{SL}$=6 V. By setting the voltage values as stated above, a write current flows from the source region S to the drain region D, hot electrons that are generated in the boundary part between the control gate CG and the memory gate MG are injected into the charge trapping region 17, and the threshold voltages Vt1 and Vt2 of the memory cells MC1 and MC2 increase.

On the other hand, in order to reduce the threshold voltages Vt1 and Vt2 of the memory cells MC1 and MC2, for example, the voltage values of the memory cells MC1 and MC2 are set to $V_D$=0 V, $V_{CG}$=0 V, $V_{MG}$=−10 V, and $V_{SL}$=6 V. By setting the voltage values as stated above, a high electric field is applied between the SL junction and the memory gate MG, and a hot hole is generated due to BtoB (Band-to-Band tunneling). This hot hole is injected into the charge trapping region 17, and the threshold voltages Vt1 and Vt2 of the memory cells MC1 and MC2 are reduced.

Further, in order to read out data from the memory cells MC1 and MC2, for example, the voltage values of the memory cells MC1 and MC2 are set to $V_D$=1.5 V, $V_{CG}$=1.5 V, $V_{MG}$=0 V, and $V_{SL}$=0 V. In this case, when the threshold voltages Vt1 and Vt2 of the memory cells MC1 and MC2 are low, the memory cells MC1 and MC2 are in the ON state. On the other hand, when the threshold voltages Vt1 and Vt2 of the memory cells MC1 and MC2 are high, the memory cells MC1 and MC2 are in the OFF state.

The voltage values $V_D$, $V_{CG}$, $V_{MG}$, and $V_{SL}$ of the memory cells MC1 and MC2 described above are merely examples, and values other than those stated above may be used in the semiconductor device according to this embodiment. Further, the configuration of the memory cells MC1 and MC2 shown in FIG. 2 is merely one example, and a memory cell having a configuration other than that shown in FIG. 2 may be used in the semiconductor device according to this embodiment.

Figure 3A:
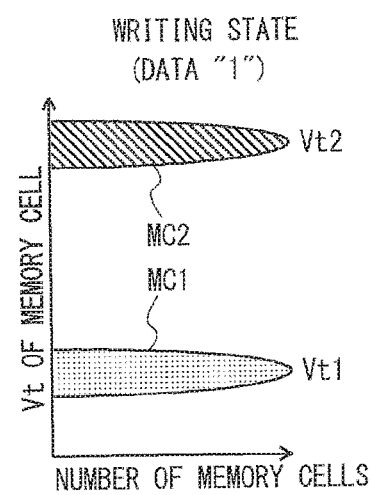
FIGS. 3A to 3C are diagrams showing a distribution of threshold voltages Vt1 and Vt2 of memory cells MC1 and MC2 forming a complementary cell.
Figure 3B:
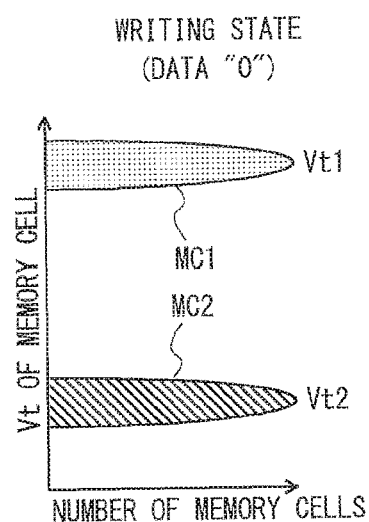
Figure 3C:
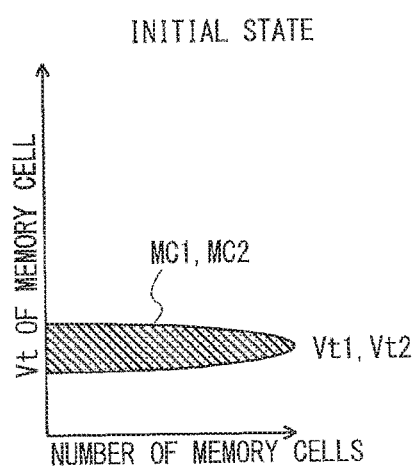

FIGS. 3A to 3C are diagrams showing a distribution of the threshold voltages Vt1 and Vt2 of the memory cells MC1 and MC2 that form the complementary cell 11. The complementary cell 11 is configured to be able to hold data using the difference between the threshold voltage Vt1 of the memory cell MC1 and the threshold voltage Vt2 of the memory cell MC2. In other words, the complementary cell 11 is configured to be able to hold data using the two-bit memory cells MC1 and MC2.

For example, as shown in FIG. 3A, when the threshold voltage Vt2 of the memory cell MC2 is higher than the threshold voltage Vt1 of the memory cell MC1, data "1" is written in the complementary cell 11. In other words, when the threshold voltage Vt1 of the memory cell MC1 is in the low level and the threshold voltage Vt2 of the memory cell MC2 is in the high level, data "1" is written to the complementary cell 11.

On the other hand, as shown in FIG. 3B, when the threshold voltage Vt1 of the memory cell MC1 is higher than the threshold voltage Vt2 of the memory cell MC2, data "0" is written in the complementary cell 11. In other words, when the threshold voltage Vt1 of the memory cell MC1 is in the high level and the threshold voltage Vt2 of the memory cell MC2 is in the low level, data "0" is written in the complementary cell 11.

The memory cell MC1 may be herein referred to as a "positive memory" and the memory cell MC2 may be herein referred to as a "negative memory". Further, in this embodiment, the relation between the threshold voltages Vt1 and Vt2 of the memory cells MC1 and MC2 and the data in the complementary cell 11 (states of "1" and "0") may be defined in such a way that this relation becomes opposite to that in the case shown in FIGS. 3A and 3B. That is, when the threshold voltage Vt1 of the memory cell MC1 is higher than the threshold voltage Vt2 of the memory cell MC2, data "1" may be written in the complementary cell 11. Further, when the threshold voltage Vt2 of the memory cell MC2 is higher than the threshold voltage Vt1 of the memory cell MC1, data "0" may be written in the complementary cell 11.

The aforementioned state of the threshold voltages Vt1 and Vt2 of the memory cells MC1 and MC2 can be read out using a sense amplifier SA provided in the memory array 10. Further, the data writing to the memory cells MC1 and MC2 and the data reading from the memory cells MC1 and MC2 described above can be executed using the memory control circuit 40. Specifically, by controlling the bit lines BL1 and BL2, the word line WL, the memory gate selection line MGL, the source line SL and the like of the memory cell array 10 using the memory control circuit 40, the data writing to the memory cells MC1 and MC2 and the data reading from the memory cells MC1 and MC2 can be executed.

FIG. 3C shows a distribution of the threshold voltages Vt1 and Vt2 of the memory cells MC1 and MC2 in the initial state after the memory array 10 is manufactured. As shown in FIG. 3C, in the initial state, the distributions of the threshold voltages Vt1 and Vt2 of the memory cells MC1 and MC2 overlap each other, and the threshold voltages Vt1 and Vt2 uniformly vary. In the following description, the threshold voltages Vt1 and Vt2 of the memory cells MC1 and MC2 may be collectively referred to as a threshold voltage Vt.

Figure 4:
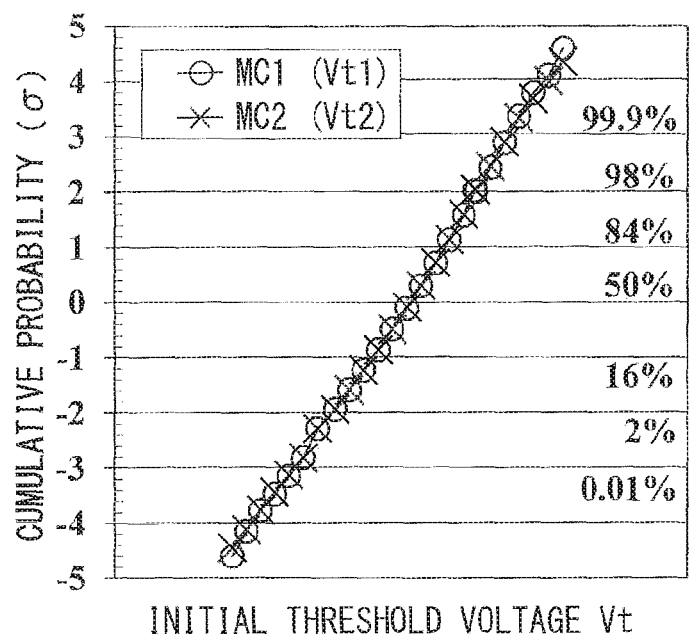
FIG. 4 is a diagram showing a relation between initial threshold voltages Vt of the memory cells MC1 and MC2 and a cumulative probability.

FIG. 4 is a diagram showing a relation between the initial threshold voltages Vt of the memory cells MC1 and MC2 and a cumulative probability. As shown in FIG. 4, the initial threshold voltages Vt of the memory cells MC1 and MC2 uniformly varies. Therefore, when the memory cells MC1 and MC2 are randomly retrieved to examine the threshold voltages Vt1 and Vt2, there may be a difference between the threshold voltage Vt1 and the threshold voltage Vt2.

Figure 5:
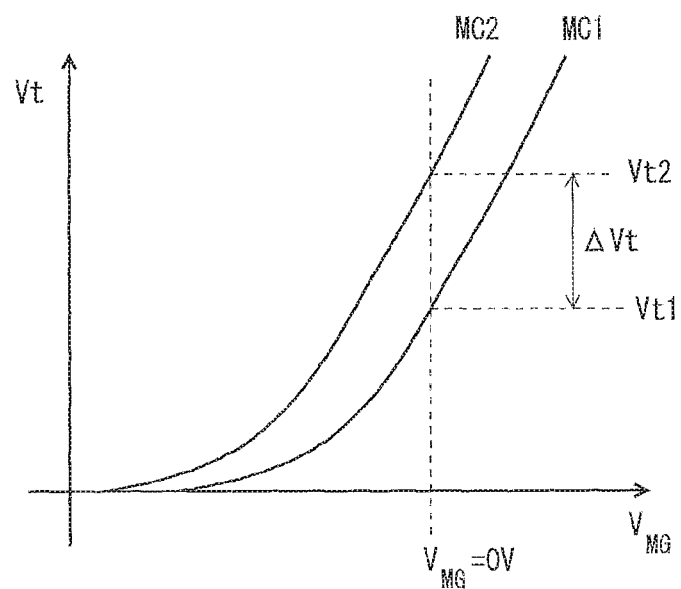
FIG. 5 is a diagram showing initial threshold voltages Vt1 and Vt2 of the memory cells MC1 and MC2.

FIG. 5 is a diagram showing the initial threshold voltages Vt1 and Vt2 of the memory cells MC1 and MC2. Specifically, FIG. 5 shows changes in the threshold voltages Vt1 and Vt2 of the memory cells MC1 and MC2 with respect to a change in the voltage $V_{MG}$ of the memory gate MG. As shown in FIG. 5, when $V_{MG}$=0 V, there is a potential difference ΔVt between the initial threshold voltage Vt1 of the memory cell MC1 and the initial threshold voltage Vt2 of the memory cell MC2. $V_{MG}$=0 V corresponds to a set voltage $V_{MG}$ of the memory gate MG when data is read out from the memory cells MC1 and MC2.

As described above, when there is a potential difference ΔV between the initial threshold voltage Vt1 of the memory cell MC1 and the initial threshold voltage Vt2 of the memory cell MC2, it is possible to read out predetermined data ("1" or "0") by carrying out processing of reading out data by connecting the memory cell MC1 and the memory cell MC2 to the sense amplifier SA. In the example shown in FIG. 5, the initial threshold voltage Vt2 of the memory cell MC2 is higher than the initial threshold voltage Vt1 of the memory cell MC1. In this case, data "1" is read out.

As described above, in this embodiment, by applying the PUF technology to each of the memory cells MC1 and MC2 (non-volatile memories) of the memory array 10 and reading out data due to the variations of the initial threshold voltages Vt1 and Vt2 after the memory cells MC1 and MC2 have been manufactured, the ID specific to the memory array 10 can be generated.

As one example, if the potential difference ΔVt between the initial threshold voltages Vt1 and Vt2 of the memory cells MC1 and MC2 needs to be equal to or larger than 0.5 V in FIG. 5, about 0.763 σ (22.3%) of the memory cells cannot be used to generate the unique ID since the difference between the initial threshold voltages Vt1 and Vt2 of the memory cells MC1 and MC2 is small and the data that has been read out becomes indefinite. In other words, when the potential difference ΔVt between the threshold voltages to be required is set to be equal to or larger than 0.5 V, about 75% of all the memory cells can be used to generate the unique ID.

Figure 6:
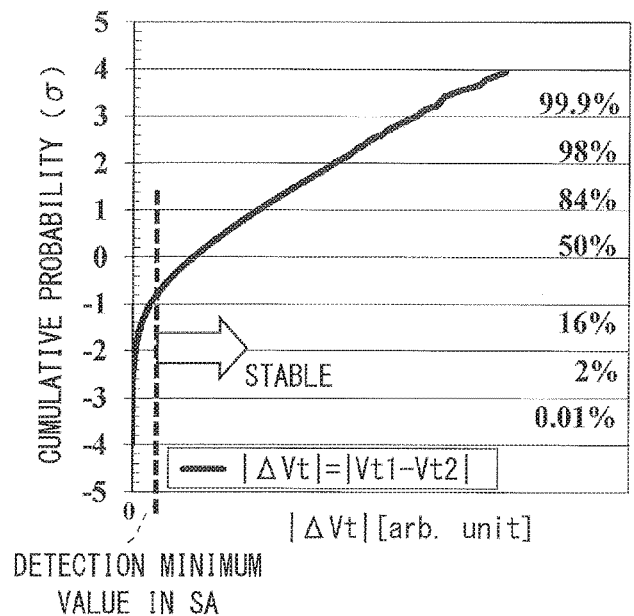
FIG. 6 is a diagram showing a relation between a difference ($\Delta$Vt) between the initial threshold voltages and the cumulative probability.

FIG. 6 is a diagram showing a relation between the potential difference ΔVt between the initial threshold voltages Vt1 and Vt2 and the cumulative probability. As shown in FIG. 6, when a predetermined value |ΔVt| (e.g., 0.5 V) is set as a detection minimum value in the sense amplifier SA, in memory cells of tens of percent or less, the value of |ΔVt| becomes smaller than the predetermined value of |ΔVtl|. When the data in these memory cells are read out, the data becomes unstable (indefinite) and the error rate increases when the unique ID is generated.

In this embodiment, using the unique ID generation circuit 20 shown in FIG. 1, these unstable memory cells (bits) are specified, and these memory cells are masked so that these cells are not used when the unique ID is generated. In other words, the unique ID is generated by extracting only the memory cells having ΔVt equal to or larger than a minimum sensitivity of the sense amplifier SA. It is therefore possible to improve the reliability of the unique ID that has been generated. In the following description, the unique ID generation circuit 20 will be explained.

The unique ID generation circuit 20 shown in FIG. 1 generates the ID specific to the memory array 10 using the initial threshold voltage Vt1 of the memory cell MC1 and the initial threshold voltage Vt2 of the memory cell MC2. In this case, the unique ID generation circuit 20 reads data (first data) in the complementary cell 11 in a first state in which the initial threshold voltage Vt1 of the memory cell MC1 has been virtually offset and reads data (second data) in the complementary cell 11 in a second state in which the initial threshold voltage Vt2 of the memory cell MC2 has been virtually offset. When the data (the first data) in the complementary cell 11 read out in the first state coincides with the data (the second data) in the complementary cell 11 read out in the second state, the data in the complementary cell 11 is used as the unique ID.

As shown in FIG. 1, the unique ID generation circuit 20 includes a holding circuit 21, a determination circuit 22, a determination result storage circuit 23, and an offset control circuit 24.

The holding circuit 21 temporarily holds the data read out from the memory array 10 when the unique ID is generated, that is, the data output from the sense amplifier SA. Specifically, the holding circuit 21 temporarily holds the data (the first data) in the complementary cell 11 read out in the first state in which the initial threshold voltage Vt1 of the memory cell MC1 has been virtually offset and the data (the second data) in the complementary cell 11 read out in the second state in which the initial threshold voltage Vt2 of the memory cell MC2 has been virtually offset.

The determination circuit 22 receives the data (the first data) in the complementary cell 11 that has been read out in the first state and has been held in the holding circuit 21 and the data (the second data) in the complementary cell 11 that has been read out in the second state and has been held in the holding circuit 21, and determines whether these data coincide with each other.

The determination result storage circuit 23 stores the results of the determination in the determination circuit 22.

For example, the determination result storage circuit 23 may store address information on the complementary cell 11 in which the data in the complementary cell 11 read out in the first state and the data in the complementary cell 11 read out in the second state have not coincided with each other. In this case, the unique ID generation circuit 20 is able to generate the unique ID without using the complementary cell 11 that corresponds to the address information stored in the determination result storage circuit 23 (i.e., the unstable complementary cell with a low reliability) when the next unique ID is generated.

Further, for example, the determination result storage circuit 23 may store the address information on the complementary cell 11 in which the data in the complementary cell 11 read out in the first state and the data in the complementary cell 11 read out in the second state have coincided with each other. In this case, the unique ID generation circuit 20 is able to generate the unique ID using the complementary cell 11 that corresponds to the address information stored in the determination result storage circuit 23 (i.e., the stable complementary cell with a high reliability) when the next unique ID is generated.

The offset control circuit 24 controls the offset circuit 30 to virtually reduce the initial threshold voltage Vt1 of the memory cell MC1. In a similar way, the offset control circuit 24 controls the offset circuit 30 to virtually reduce the initial threshold voltage Vt2 of the memory cell MC2.

In the configuration example shown in FIG. 1, the offset circuit 30 is composed of transistors Tr1 and Tr2. The transistor Tr1 is connected between the bit line BL1 of the memory array 10 and the ground potential, and includes a gate to which an offset control signal Ctrl is supplied from the offset control circuit 24. The transistor Tr1 is switched to the ON state when it is supplied with a high-level offset control signal Ctrl from the offset control circuit 24. In this case, the bit line BL1 is electrically connected to the ground potential via the transistor Tr1. Therefore, the current is drawn out from the bit line BL1, and the initial threshold voltage Vt1 of the memory cell MC1 is virtually reduced.

In a similar way, the transistor Tr2 is connected between the bit line BL2 of the memory array 10 and the ground potential, and includes a gate to which an offset control signal Ctr2 is supplied from the offset control circuit 24. The transistor Tr2 is switched to the ON state when it is supplied with a high-level offset control signal Ctr2 from the offset control circuit 24. In this case, the bit line BL2 is electrically connected to the ground potential via the transistor Tr2. Therefore, the current is drawn out from the bit line BL2, and the initial threshold voltage Vt2 of the memory cell MC2 is virtually reduced.

As described above, in the configuration example shown in FIG. 1, the transistors Tr1 and Tr2 serve as current drawing circuits.

When the unique ID is generated in the semiconductor device according to this embodiment, the unique ID generation circuit 20 first switches on the transistor Tr1 and switches off the transistor Tr2. When the transistor Tr1 is turned on, the current is drawn out from the bit line BL1 and the initial threshold voltage Vt1 of the memory cell MC1 is virtually reduced. In this state (the first state), the data (the first data) in the complementary cell 11 is read out. Next, the transistor Tr1 is switched to the OFF state and the transistor Tr2 is switched to the ON state. When the transistor Tr2 is turned on, the current is drawn out from the bit line BL2, and the initial threshold voltage Vt2 of the memory cell MC2 is virtually reduced. In this state (the second state), the data (the second data) in the complementary cell 11 is read out. When the first data in the complementary cell 11 read out in the first state coincides with the second data in the complementary cell 11 read out in the second state, the data in the complementary cell 11 is used as the unique ID.

Figure 7:
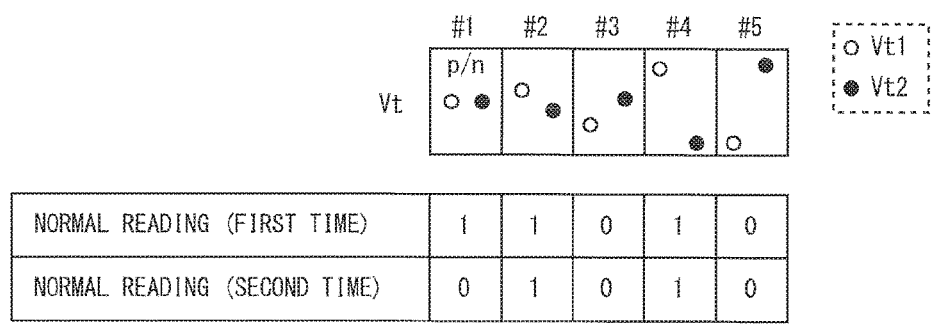
FIG. 7 is a diagram showing a relation between the initial threshold voltages Vt1 and Vt2 of the memory cells MC1 and MC2 included in each of complementary cells #1-#5 and data that has been read out.

FIG. 7 is a diagram showing a relation between the initial threshold voltages Vt1 and Vt2 of the memory cells MC1 and MC2 included in each of complementary cells #1-#5 and the data that has been read out. The white circle and the black circle in each of the complementary cells #1-#5 in FIG. 7 respectively indicate the values of the threshold voltages Vt1 and Vt2 of the memory cells MC1 and MC2 that form the complementary cells #1-#5. Specifically, the white circle (p) indicates the value of the threshold voltage Vt1 of the memory cell MC1 (positive memory) and the black circle (n) indicates the value of the threshold voltage Vt2 of the memory cell MC2 (negative memory). Further, FIG. 7 shows that the values of the threshold voltages Vt1 and Vt2 become larger as the white circle and the black circle go upward.

As shown in FIG. 3C, in the initial state after the memory array 10 has been manufactured, the distributions of the threshold voltages Vt1 and Vt2 of the memory cells MC1 and MC2 overlap each other. Since there is a variation in the threshold voltages Vt1 and Vt2 of the memory cells MC1 and MC2, as shown in FIG. 3C, there is also a variation in the threshold voltages Vt1 and Vt2 of the memory cells MC1 and MC2 that composes each of the complementary cells 11. Therefore, as shown in FIG. 7, in the initial state after the memory array 10 has been manufactured, there is a variation in the threshold voltages Vt1 and Vt2 of the memory cells MC1 and MC2 that compose the complementary cell 11. Specifically, in the complementary cell #1, a case in which the threshold voltages Vt1 and Vt2 of the memory cells MC1 and MC2 have substantially the same value is shown. In the complementary cells #2 and #3, a case in which, while there is a difference between the values of the threshold voltages Vt1 and Vt2 of the memory cells MC1 and MC2, the potential difference ΔVt between them is small is shown. In the complementary cells #4 and #5, a case in which the potential difference ΔVt between the threshold voltages Vt1 and Vt2 of the memory cells MC1 and MC2 is large is shown.

When the normal reading operation (first time) is executed in the complementary cells #1-#5, as shown in FIG. 7, the data in the complementary cell #1 becomes "1", the data in the complementary cell #2 becomes "1", the data in the complementary cell #3 becomes "0", the data in the complementary cell #4 becomes "1", and the data in the complementary cell #5 becomes "0".

After that, when the normal reading operation (second time) is executed in the complementary cells #1-#5, as shown in FIG. 7, the data in the complementary cell #1 becomes "0", the data in the complementary cell #2 becomes "1", the data in the complementary cell #3 becomes "0", the data in the complementary cell #4 becomes "1", and the data in the complementary cell #5 becomes "0".

That is, in the complementary cell #1, the threshold voltages Vt1 and Vt2 of the memory cells MC1 and MC2 are substantially the same value. Therefore, the data that has been read out in the first reading and the data that has been read out in the second reading are inverted from each other. From the discussion above, when the unique ID is generated using the complementary cell in which the potential difference ΔVt between the threshold voltages Vt1 and Vt2 is small, the resulting data becomes unstable (indefinite), and the error rate increases when the unique ID is generated.

In this embodiment, using the unique ID generation circuit 20, the memory cells (bits) that tend to be unstable (indefinite) are specified and these memory cells are masked so that these masks are not used to generate the unique ID. In the following description, an operation of the semiconductor device according to this embodiment (the unique ID generation method) will be explained in detail with reference to FIGS. 8 and 9.

Figure 8:
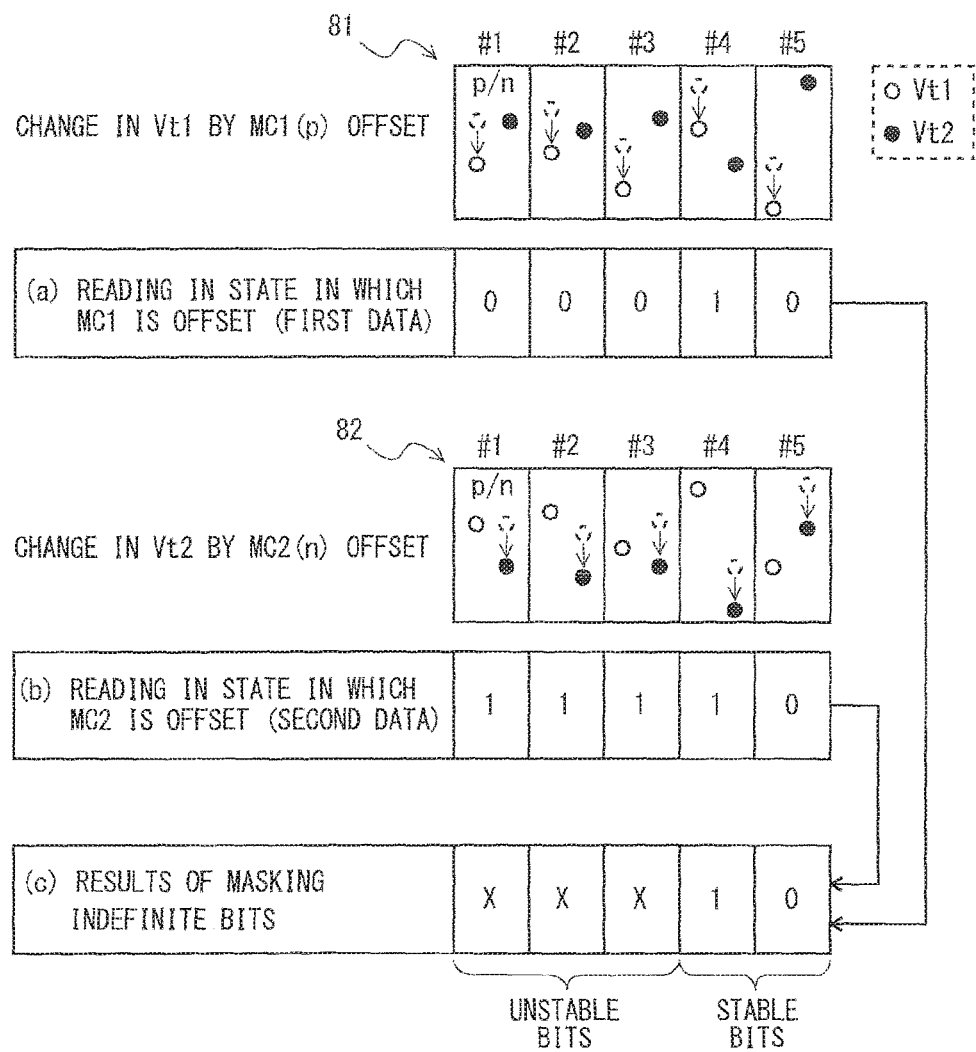
FIG. 8 is a diagram for describing an operation of the semiconductor device according to the first embodiment.
Figure 9:
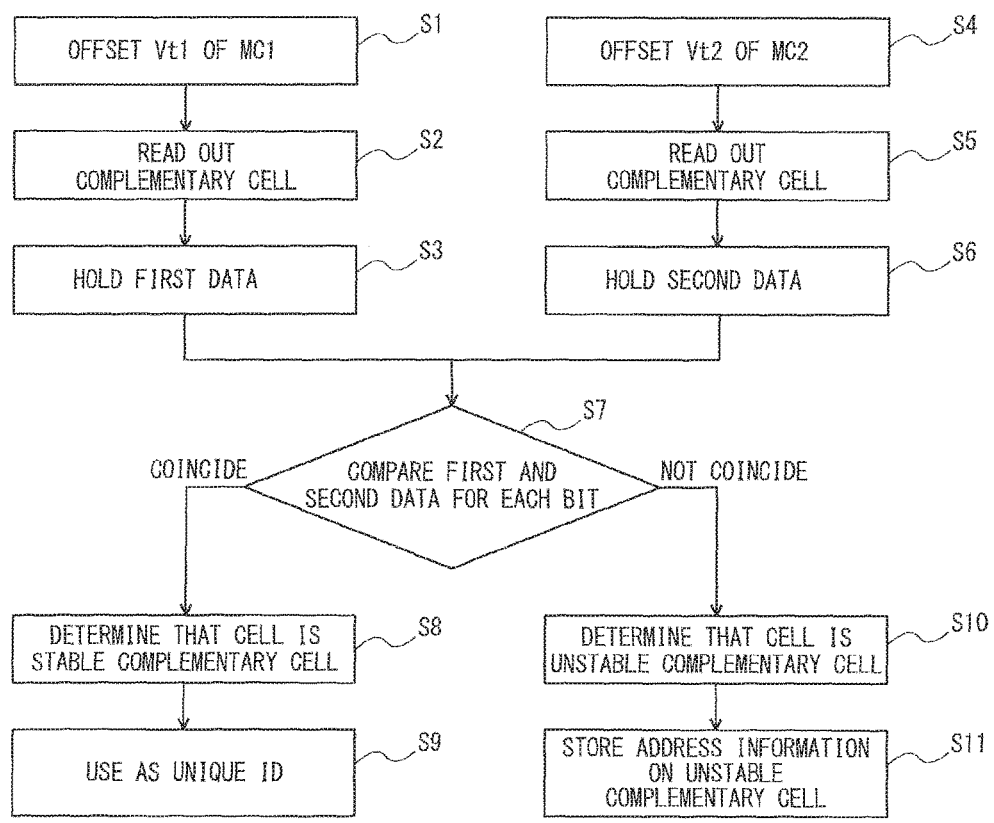
FIG. 9 is a flowchart for describing the operation of the semiconductor device according to the first embodiment.

FIG. 8 is a diagram for describing an operation of the semiconductor device according to this embodiment. FIG. 9 is a flowchart for describing the operation of the semiconductor device according to this embodiment. Note that the initial threshold voltages Vt1 and Vt2 of the memory cells MC1 and MC2 in each of the complementary cells #1-#5 shown in FIG. 8 are similar to the initial threshold voltages Vt1 and Vt2 of the memory cells MC1 and MC2 in each of the complementary cells #1-#5 shown in FIG. 7.

When the unique ID is generated using the semiconductor device according to this embodiment, first, the initial threshold voltage Vt1 of the memory cell MC1 of each of the complementary cells #1-#5 is offset (Step S1 in FIG. 9). Specifically, the offset control circuit 24 shown in FIG. 1 supplies the high-level offset control signal Ctrl to the gate of the transistor Tr1 and the low-level offset control signal Ctr2 to the gate of the transistor Tr2. Accordingly, the transistor Tr1 is switched to the ON state and the transistor Tr2 is switched to the OFF state. When the transistor Tr1 is turned on, the bit line BL1 is electrically connected to the ground potential via the transistor Tr1, the current is drawn out from the bit line BL1, and the initial threshold voltage Vt1 of the memory cell MC1 is virtually reduced.

That is, when the current is drawn out from the bit line BL1 to which the memory cell MC1 is connected, as shown in a symbol 81 in FIG. 8, the initial threshold voltage Vt1 of the memory cell MC1 of each of the complementary cells #1-#5 is virtually reduced.

When the data (the first data) in each of the complementary cells #1-#5 is read out in this state (Step S2 in FIG. 9), as shown in (a) in FIG. 8, the data in the complementary cell #1 becomes "0", the data in the complementary cell #2 becomes "0", the data in the complementary cell #3 becomes "0", the data in the complementary cell #4 becomes "1", and the data in the complementary cell #5 becomes "0".

For example, the unique ID generation circuit 20 shown in FIG. 1 sends an instruction to the memory control circuit 40 to cause the memory control circuit 40 to execute a reading operation to the memory cell array 10. When the memory control circuit 40 receives the instruction from the unique ID generation circuit 20, it executes the reading operation to the memory cell array 10.

When the reading operation is executed, the data (the first data) in each of the complementary cells #1-#5 is output from the sense amplifier SA. This output data (the first data) is temporarily held in the holding circuit 21 (Step S3 in FIG. 9).

Next, the initial threshold voltage Vt2 of the memory cell MC2 of each of the complementary cells #1-#5 is offset (Step S4 in FIG. 9). Specifically, the offset control circuit 24 shown in FIG. 1 supplies the low-level offset control signal Ctrl to the gate of the transistor Tr1 and the high-level offset control signal Ctrl to the gate of the transistor Tr2. Accordingly, the transistor Tr1 is switched to the OFF state and the transistor Tr2 is switched to the ON state. When the transistor Tr2 is turned on, the bit line BL2 is electrically connected to the ground potential via the transistor Tr2, the current is drawn out from the bit line BL2, and the initial threshold voltage Vt2 of the memory cell MC2 is virtually reduced.

That is, when the current is drawn out from the bit line BL2 to which the memory cell MC2 is connected as shown in a symbol 82 in FIG. 8, the initial threshold voltage Vt2 of the memory cell MC2(n) of each of the complementary cells #1-#5 is virtually reduced.

When the data (the second data) in the complementary cells #1-#5 is read out in this state (Step S5 in FIG. 9), as shown in (b) in FIG. 8, the data in the complementary cell #1 becomes "1", the data in the complementary cell #2 becomes "1", the data in the complementary cell #3 becomes "1", the data in the complementary cell #4 becomes "1", and the data in the complementary cell #5 becomes "0".

When the reading operation is executed, the data (the second data) in each of the complementary cells #1-#5 is output from the sense amplifier SA. This output data (the second data) is temporarily held in the holding circuit 21 (Step S6 in FIG. 9).

After that, the determination circuit 22 shown in FIG. 1 receives the first and second data held in the holding circuit 21 and compares whether these data coincide with each other for each bit (Step S7 in FIG. 9). When the first and second data coincide with each other, the determination circuit 22 determines that the complementary cell in which the first and second data coincide with each other is the stable complementary cell (the stable bit) (Step S8). The data read out from the complementary cell determined to be the stable complementary cell in Step S8 is used as the unique ID (Step S9).

On the other hand, when the first and second data do not coincide with each other, the determination circuit 22 determines that this complementary cell is the unstable complementary cell (the unstable bit) (Step S10). In this case, the determination result storage circuit 23 shown in FIG. 1 stores the address information on the complementary cell that has been determined to be the unstable complementary cell in Step S10 (Step S11). The unique ID generation circuit 20 is able to generate the unique ID without using the complementary cell 11 that corresponds to the address information stored in the determination result storage circuit 23 (i.e., the unstable complementary cell with a low reliability) when the next unique ID is generated.

That is, as shown in FIG. 8, in the complementary cells #1-#3, the data (the first data) read out in the state in which the threshold voltage Vt1 of the memory cell MC1 is virtually offset and the data (the second data) read out in the state in which the threshold voltage Vt2 of the memory cell MC2 is virtually offset are inverted from each other (i.e., indefinite: X). Accordingly, in the complementary cells #1-#3, since the potential difference ΔVt between the threshold voltage Vt1 of the memory cell MC1 and the threshold voltage Vt2 of the memory cell MC2 is small, it can be said that this cell is too unstable to be used as the unique ID.

On the other hand, in the complementary cells #4 and #5, the data (the first data) read out in the state in which the threshold voltage Vt1 of the memory cell MC1 is virtually offset and the data (the second data) read out in the state in which the threshold voltage Vt2 of the memory cell MC2 is virtually offset coincide with each other. Accordingly, in the complementary cells #4 and #5, since the potential difference ΔVt between the threshold voltage Vt1 of the memory cell MC1 and the threshold voltage Vt2 of the memory cell MC2 is large, this cell can be used as the highly reliable unique ID.

In this embodiment, it is possible to improve the reliability of the unique ID that has been generated by masking the unstable complementary cells #1-#3 and generating the unique ID using the stable complementary cells #4 and #5.

In Step S11 in the flowchart shown in FIG. 9, the determination result storage circuit 23 shown in FIG. 1 may store the address information on the complementary cell determined to be the stable complementary cell instead of storing the address information on the complementary cell determined to be the unstable complementary cell. In this case, the unique ID generation circuit 20 is able to generate the unique ID using the complementary cell 11 that corresponds to the address information stored in the determination result storage circuit 23 (i.e., the stable complementary cell with a high reliability) when the next unique ID is generated.

Figure 10:
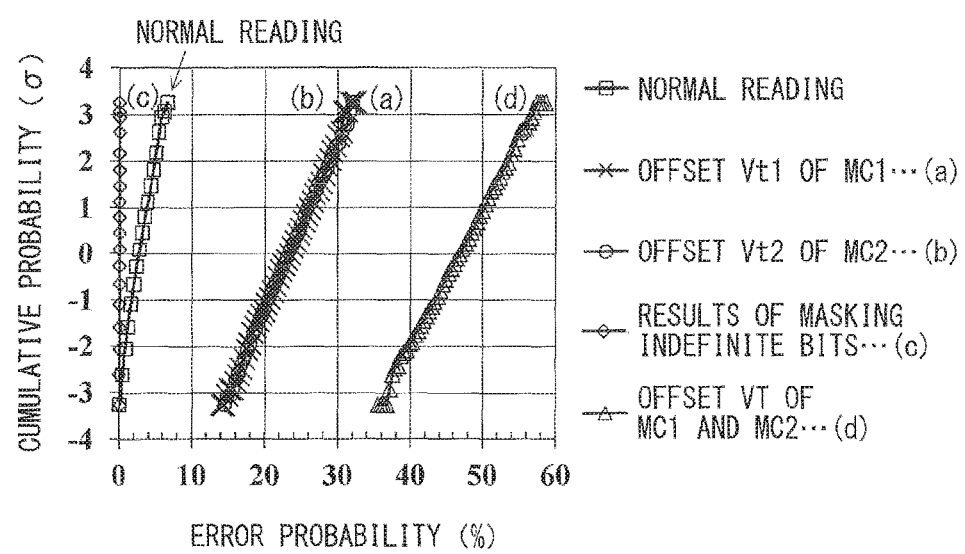
FIG. 10 is a diagram showing a relation between an error probability and a cumulative probability when data in the complementary cell is read out.

FIG. 10 is a diagram showing a relation between an error probability and the cumulative probability when the data in the complementary cell is read out. As shown in FIG. 10, when the data in the complementary cell composed of the memory cells MC1 and MC2 (the initial threshold voltages Vt1 and Vt2) is read out in the normal method, a reading error occurs with a certain probability. Therefore, when the unique ID generation method according to this embodiment is not used, the reliability of the unique ID that has been generated is reduced.

The symbols (a)-(c) in FIG. 10 correspond to (a)-(c) shown in FIG. 8. That is, (a) in FIG. 10 indicates the error probability when the data in the complementary cell has been read out in the state in which the initial threshold voltage Vt1 of the memory cell MC1 is offset. Further, (b) in FIG. 10 indicates the error probability when the data in the complementary cell has been read out in the state in which the initial threshold voltage Vt2 of the memory cell MC2 is offset. Further, (c) in FIG. 10 indicates the error probability after the unstable complementary cell (indefinite bit) is masked. The symbol (d) in FIG. 10 corresponds to the value obtained by adding the error probability shown in (a) in FIG. 10 and the error probability shown in (b) in FIG. 10.

As shown in (a), (b), and (d) in FIG. 10, when the data in the complementary cell is read out in the state in which the initial threshold voltages Vt1 and Vt2 of the memory cells MC1 and MC2 are offset, the error probability is high. This indicates that the complementary cell that may potentially cause an error can be extracted by offsetting the threshold voltages Vt1 and Vt2.

Further, as shown in (c) in FIG. 10, the error probability after the unstable complementary cell (indefinite bit) is masked is lower than the error probability in the case in which the normal reading is performed. Accordingly, by masking the unstable complementary cell using the unique ID generation method according to this embodiment, it is possible to improve the reliability of the unique ID that has been generated.

Figure 11:
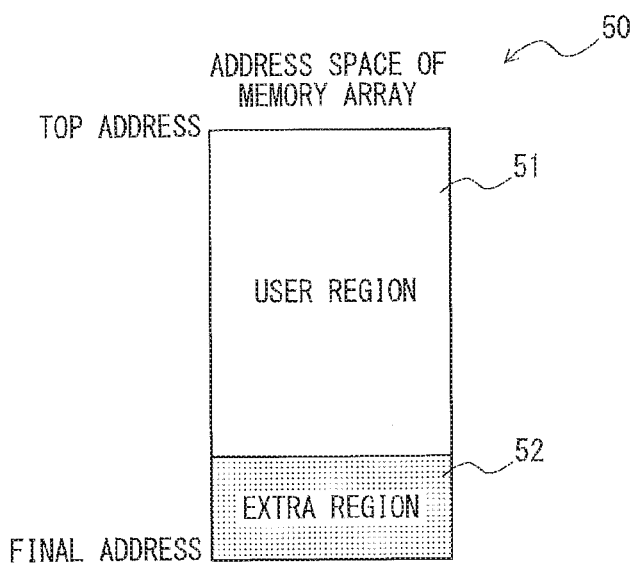
FIG. 11 is a diagram for describing one example of an address space of a memory array included in the semiconductor device according to the first embodiment.

FIG. 11 is a diagram for describing an address space 50 of the memory array 10 included in the semiconductor device 1 according to this embodiment. As shown in FIG. 11, a user region 51 and an extra region 52 are provided in the address space 50 of the memory array 10. In this embodiment, by using a part of the extra region 52 as a region to obtain the initial threshold voltage Vt, a security function can be added without changing the general memory array 10 (flash memory).

In other words, a complementary cell arranged in the address space of the user region 51 may be used as a complementary cell for data holding and a complementary cell arranged in the address space of the extra region 52 may be used as a complementary cell for unique ID generation.

Figure 12:
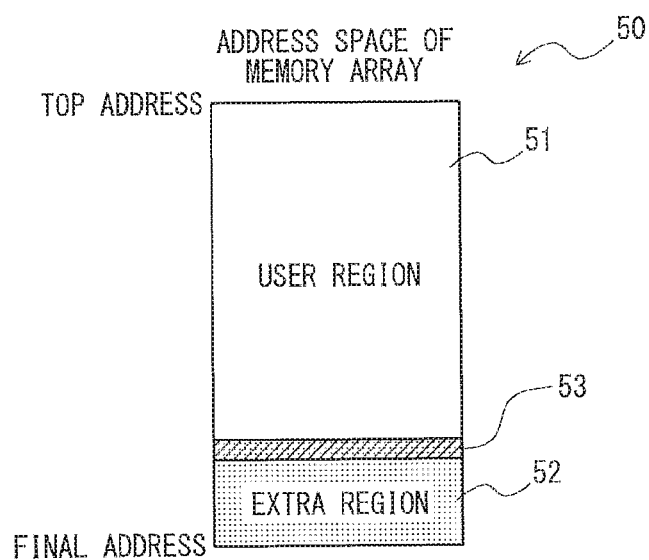
FIG. 12 is a diagram for describing one example of the address space of the memory array included in the semiconductor device according to the first embodiment.

Further, when the unique ID is generated in the unique ID generation circuit 20, the memory control circuit 40 shown in FIG. 1 may switch, when the first and second data read out from the complementary cell have not coincided with each other (i.e., when this complementary cell has been determined to be the unstable complementary cell), the complementary cell in which the first and second data have not coincided with each other from the complementary cell for unique ID generation to the complementary cell for data holding. That is, as shown in FIG. 12, when the complementary cell arranged in the address space of the extra region 52 is determined to be the unstable complementary cell when it is used as the complementary cell for unique ID generation, this unstable complementary cell may be switched to the complementary cell for data holding (the address space of the complementary cell is indicated by a symbol 53). According to this configuration, the unstable complementary cell can be efficiently used.

In the aforementioned description, as the configuration for virtually offsetting the initial threshold voltages Vt1 and Vt2 of the memory cells MC1 and MC2, the configuration in which the current is drawn out from the bit lines BL1 and BL2 and the initial threshold voltages Vt1 and Vt2 of the memory cells MC1 and MC2 are virtually reduced has been described. However, in this embodiment, a configuration in which the current is supplied to the bit lines BL1 and BL2 and the initial threshold voltages Vt1 and Vt2 of the memory cells MC1 and MC2 are virtually increased may be employed. Hereinafter, the latter configuration will be explained.

Figure 13:
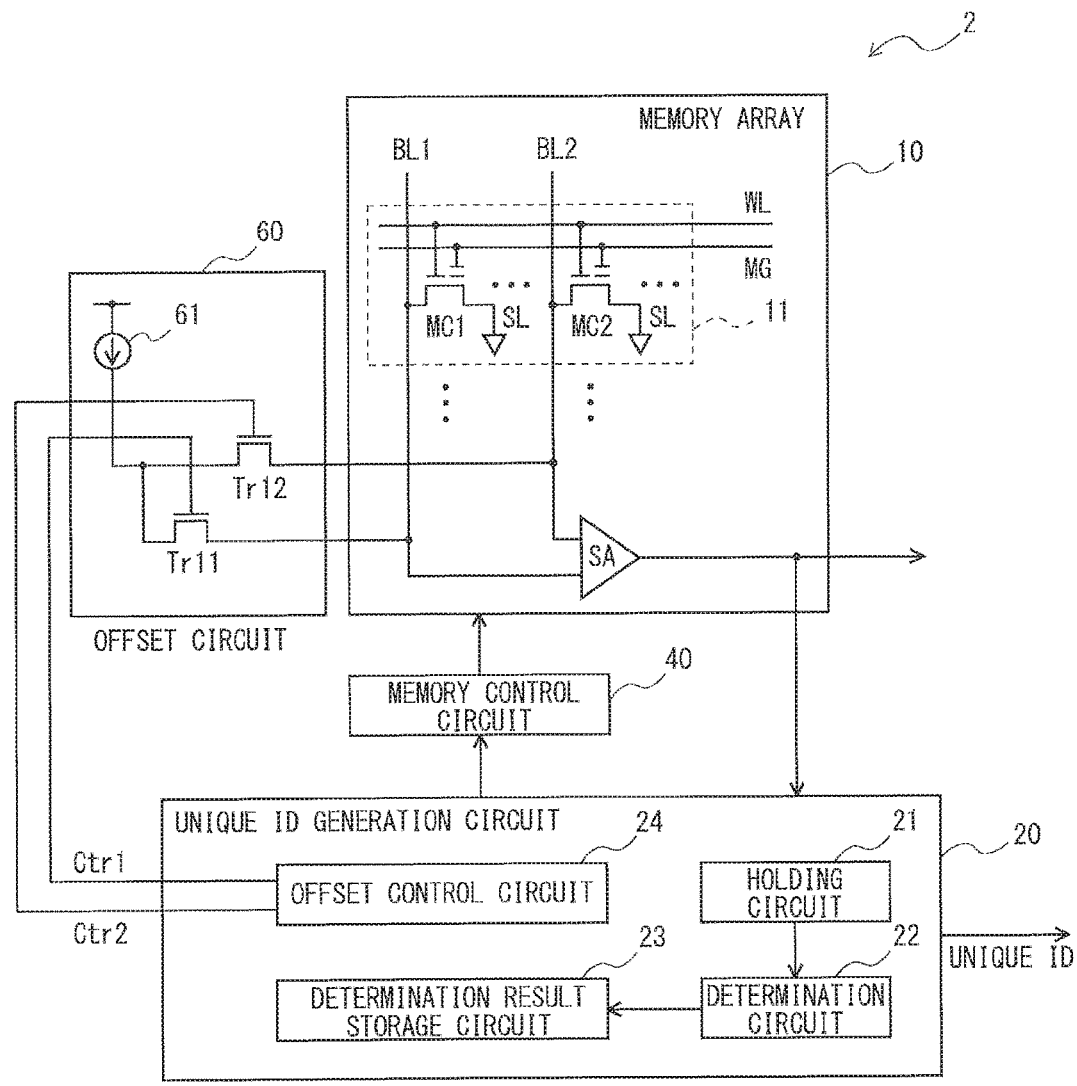
FIG. 13 is a block diagram showing another configuration example of the semiconductor device according to the first embodiment.

FIG. 13 is a block diagram showing another configuration example of the semiconductor device according to this embodiment. The configuration of an offset circuit 60 in the semiconductor device 2 shown in FIG. 13 is different from that in the semiconductor device 1 shown in FIG. 1. Since the configurations other than those stated above are similar to those of the semiconductor device 1 shown in FIG. 1, the same components are denoted by the same reference symbols and overlapping descriptions will be omitted.

In the semiconductor device 2 shown in FIG. 13, the offset control circuit 24 controls the offset circuit 60 to virtually increase the initial threshold voltage Vt1 of the memory cell MC1. In a similar way, the offset control circuit 24 controls the offset circuit 60 to virtually increase the initial threshold voltage Vt2 of the memory cell MC2.

In the configuration example shown in FIG. 13, the offset circuit 60 is composed of transistors Tr11 and Tr12 and a constant current source 61. The transistor Tr11 is connected between the bit line BL1 of the memory array 10 and the constant current source 61, and includes a gate to which the offset control signal Ctrl is supplied from the offset control circuit 24. The transistor Tr11 is turned on when the high-level offset control signal Ctrl is supplied from the offset control circuit 24. In this case, the bit line BL1 is electrically connected to the constant current source 61 via the transistor Tr11. Therefore, the current is supplied to the bit line BL1 and the initial threshold voltage Vt1 of the memory cell MC1 is virtually increased.

In a similar way, the transistor Tr12 is connected between the bit line BL2 of the memory array 10 and the constant current source 61, and includes a gate to which the offset control signal Ctr2 is supplied from the offset control circuit 24. The transistor Tr12 is turned on when it is supplied with the high-level offset control signal Ctr2 from the offset control circuit 24. In this case, the bit line BL2 is electrically connected to the constant current source 61 via the transistor Tr12. Therefore, the current is supplied to the bit line BL2 and the initial threshold voltage Vt2 of the memory cell MC2 is virtually increased.

As described above, in the configuration example shown in FIG. 13, the transistors Tr11 and Tr12 serve as current supply circuits.

In the semiconductor device 2 shown in FIG. 13 as well, the unique ID generation circuit 20 first turns on the transistor Tr11 and turns off the transistor Tr12. When the transistor Tr11 is turned on, the current is supplied to the bit line BL1 and the initial threshold voltage Vt1 of the memory cell MC1 is virtually increased. In this state (the first state), the data (the first data) in the complementary cell 11 is read out. Next, the transistor Tr11 is switched to the OFF state and the transistor Tr12 is switched to the ON state. When the transistor Tr12 is turned on, the current is supplied to the bit line BL2 and the initial threshold voltage Vt2 of the memory cell MC2 is virtually increased. In this state (the second state), the data (the second data) in the complementary cell 11 is read out. When the first data in the complementary cell 11 read out in the first state coincides with the second data in the complementary cell 11 read out in the second state, the data in the complementary cell 11 is used as the unique ID.

In the semiconductor device 2 shown in FIG. 13 as well, by using the unique ID generation circuit 20, the memory cells (bits) that tend to be unstable (indefinite) are specified and these memory cells are masked so that these masks are not used to generate the unique ID.

Figure 14:
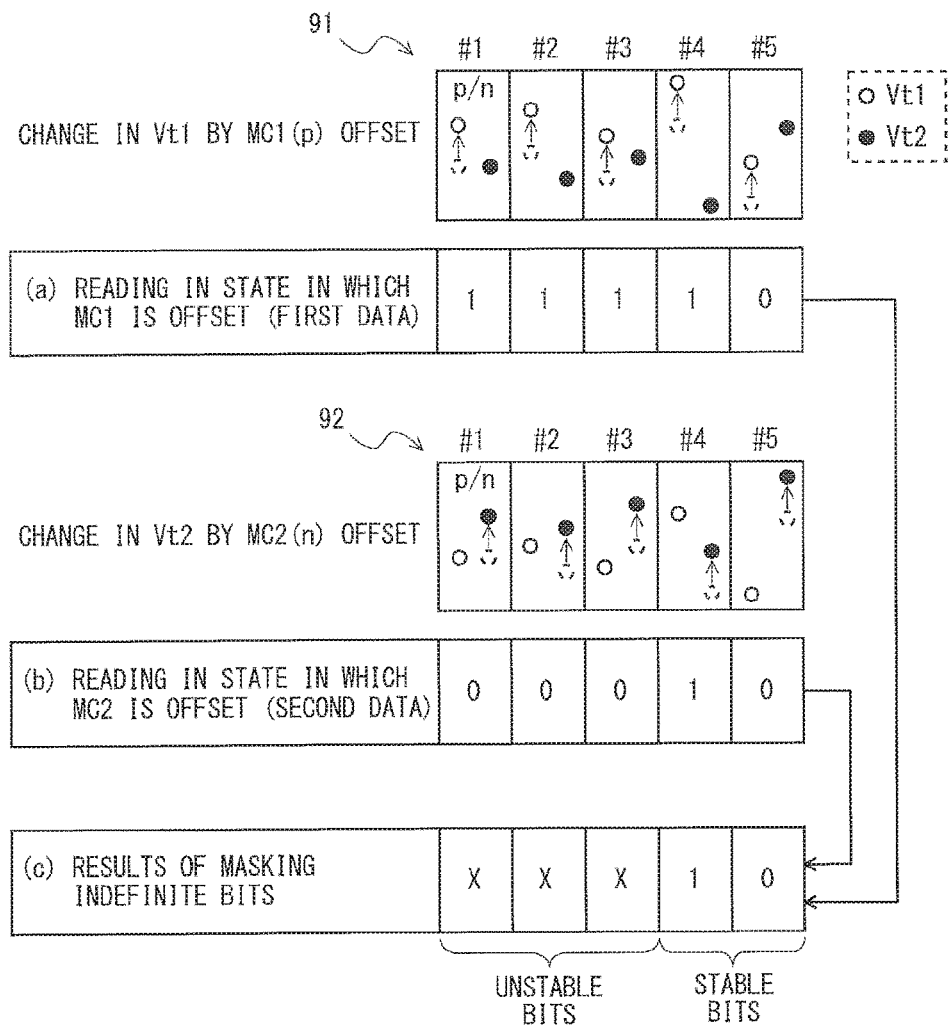
FIG. 14 is a diagram for describing an operation of the semiconductor device according to the first embodiment.

FIG. 14 is a diagram for describing an operation of the semiconductor device according to this embodiment, and corresponds to the diagram shown in FIG. 8.

When the unique ID is generated using the semiconductor device 2 shown in FIG. 13, first, the initial threshold voltage Vt1 of the memory cell MC1 of each of the complementary cells #1-#5 is offset. Specifically, the offset control circuit 24 shown in FIG. 13 supplies the high-level offset control signal Ctrl to the gate of the transistor Tr11 and the low-level offset control signal Ctrl to the gate of the transistor Tr12. Accordingly, the transistor Tr11 is switched to the ON state and the transistor Tr12 is switched to the OFF state. When the transistor Tr11 is turned on, the bit line BL1 is connected to the constant current source 61 via the transistor Tr1, the current is supplied to the bit line BL1, and the initial threshold voltage Vt1 of the memory cell MC1 is virtually increased.

That is, when the current is supplied to the bit line BL1 to which the memory cell MC1 is connected, as shown in a symbol 91 in FIG. 14, the initial threshold voltage Vt1 of the memory cell MC1 of each of the complementary cells #1-#5 is virtually increased.

When the data (the first data) in each of the complementary cells #1-#5 is read out in this state, as shown in (a) in FIG. 14, the data in the complementary cell #1 becomes "1", the data in the complementary cell #2 becomes "1", the data in the complementary cell #3 becomes "1", the data in the complementary cell #4 becomes "1", and the data in the complementary cell #5 becomes "0".

When the reading operation is executed, the data (the first data) in each of the complementary cells #1-#5 is output from the sense amplifier SA. This output data (the first data) is temporarily held in the holding circuit 21.

Next, the initial threshold voltage Vt2 of the memory cell MC2 of each of the complementary cells #1-#5 is offset. Specifically, the offset control circuit 24 shown in FIG. 13 supplies the low-level offset control signal Ctrl to the gate of the transistor Tr11 and supplies the high-level offset control signal Ctrl to the gate of the transistor Tr12. Accordingly, the transistor Tr11 is switched off and the transistor Tr12 is switched on. When the transistor Tr12 is switched on, the bit line BL2 is electrically connected to the constant current source 61 via the transistor Tr12, the current is supplied to the bit line BL2, and the initial threshold voltage Vt2 of the memory cell MC2 is virtually increased.

That is, as shown in a symbol 92 shown in FIG. 14, when the current is supplied to the bit line BL2 to which the memory cell MC2 is connected, the initial threshold voltage Vt2 of the memory cell MC2(n) of each of the complementary cells #1-#5 is virtually increased.

When the data (the second data) in the complementary cells #1-#5 is read out in this state, as shown in (b) in FIG. 14, the data in the complementary cell #1 becomes "0", the data in the complementary cell #2 becomes "0", the data in the complementary cell #3 becomes "0", the data in the complementary cell #4 becomes "1", and the data in the complementary cell #5 becomes "0".

When the reading operation is executed, the data (the second data) in each of the complementary cells #1-#5 is output from the sense amplifier SA. This output data (the second data) is temporarily held in the holding circuit 21.

After that, the determination circuit 22 shown in FIG. 13 receives the first and second data held in the holding circuit 21, and compares whether these data coincide with each other for each bit. When the first data and the second data coincide with each other, the determination circuit 22 determines that the complementary cell in which the first and second data coincide with each other is the stable complementary cell (the stable bit). The data read out from the complementary cell that has been determined to be the stable complementary cell is used as the unique ID.

On the other hand, when the first data and the second data do not coincide with each other, the determination circuit 22 determines that this complementary cell is the unstable complementary cell (the unstable bit). In this case, the determination result storage circuit 23 shown in FIG. 13 stores the address information on the complementary cell that has been determined to be the unstable complementary cell. The unique ID generation circuit 20 is able to generate the unique ID without using the complementary cell 11 that corresponds to the address information stored in the determination result storage circuit 23 (i.e., the unstable complementary cell with a low reliability) when the next unique ID is generated.

That is, as shown in FIG. 14, in the complementary cells #1-#3, the data (the first data) read out in the state in which the threshold voltage Vt1 of the memory cell MC1 is virtually offset and the data (the second data) read out in the state in which the threshold voltage Vt2 of the memory cell MC2 is virtually offset are inverted from each other (i.e., indefinite: X). Accordingly, in the complementary cells #1-#3, since the potential difference $\Delta Vt$ between the threshold voltage Vt1 of the memory cell MC1 and the threshold voltage Vt2 of the memory cell MC2 is small, it can be said that these cells are too unstable to be used as the unique ID.

On the other hand, in the complementary cells #4 and #5, the data (the first data) read out in the state in which the threshold voltage Vt1 of the memory cell MC1 is virtually offset and the data (the second data) read out in the state in which the threshold voltage Vt2 of the memory cell MC2 is virtually offset coincide with each other. Accordingly, in the complementary cells #4 and #5, since the potential difference $\Delta Vt$ between the threshold voltage Vt1 of the memory cell MC1 and the threshold voltage Vt2 of the memory cell MC2 is large, these cells can be used as highly reliable unique IDs.

In this embodiment, it is possible to improve the reliability of the unique ID that has been generated by masking the unstable complementary cells #1-#3 and generating the unique ID using the stable complementary cells #4 and #5.

According to this embodiment described above, it is possible to provide the semiconductor device and the unique ID generation method capable of improving the reliability of the unique ID that has been generated.

Second Embodiment

Next, a second embodiment will be explained.

A semiconductor device according to the second embodiment is different from the semiconductor device described in the first embodiment in that the proportion of the complementary cells that are determined to be the unstable complementary cells (memory cells) in the unique ID generation circuit 20 is made smaller than a predetermined proportion. Since the other configurations are similar to those of the semiconductor device described in the first embodiment, overlapping descriptions thereof will be omitted as appropriate.

Figure 15:
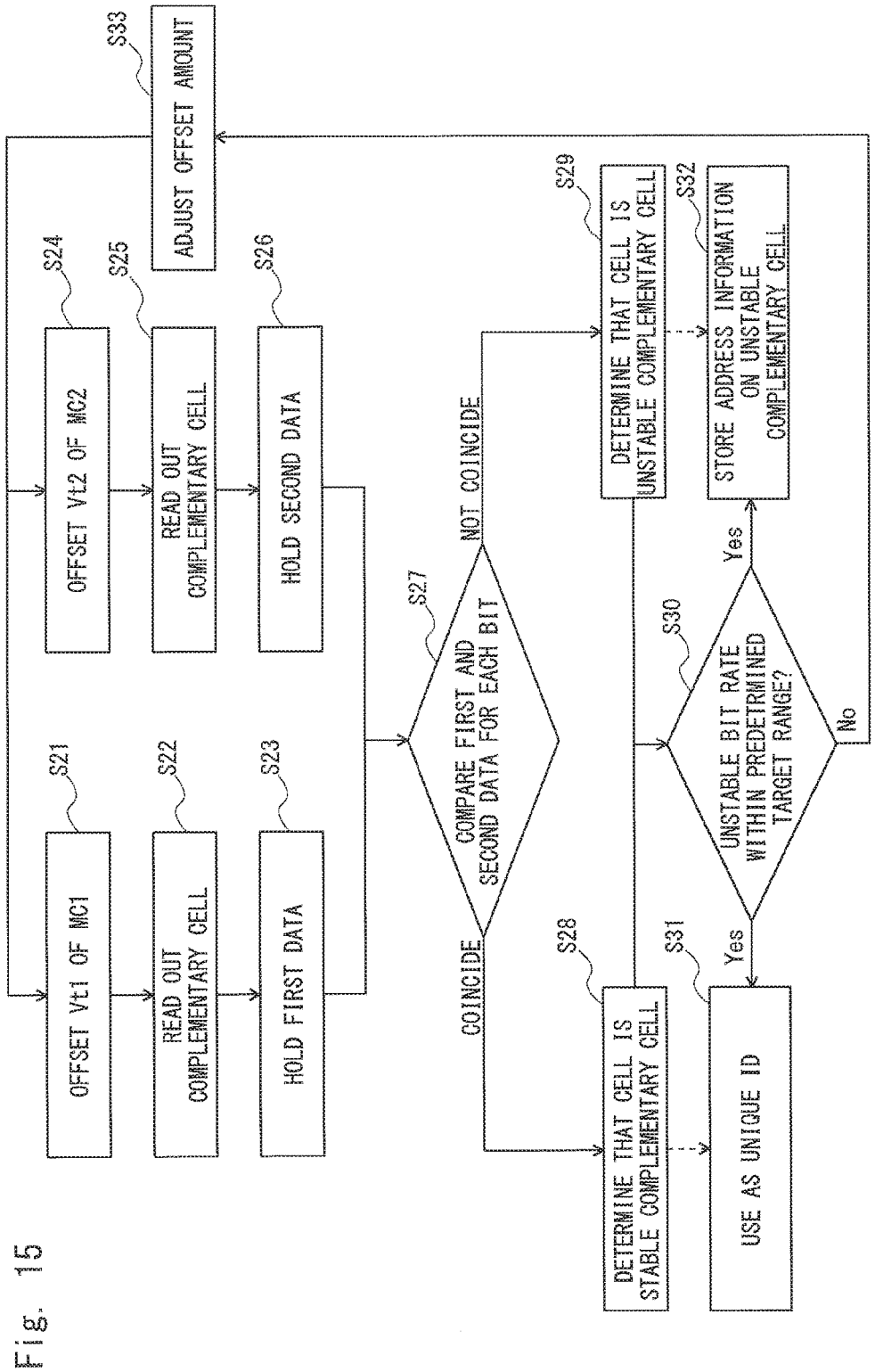
FIG. 15 is a flowchart for describing an operation of a semiconductor device according to a second embodiment.

FIG. 15 is a flowchart for describing an operation of the semiconductor device according to this embodiment. In the flowchart shown in FIG. 15, the operations in Steps S21-S27 are similar to those of Steps S1-S7 in the flowchart shown in FIG. 9. Therefore, overlapping descriptions will be omitted.

In Step S27 shown in FIG. 15, the determination circuit 22 included in the unique ID generation circuit 20 compares whether the first and second data held in the holding circuit 21 coincide with each other for each bit. When the first and second data coincide with each other, the determination circuit 22 determines that the complementary cell in which the first and second data coincide with each other is the stable complementary cell (the stable bit) (Step S28). On the other hand, when the first and second data do not coincide with each other, the determination circuit 22 determines that this complementary cell is the unstable complementary cell (the unstable bit) (Step S29).

After that, the determination circuit 22 determines whether the proportion of the complementary cells in which the first and second data do not coincide with each other (the unstable bit rate) with respect to the complementary cells in which the first and second data coincide with each other falls within a predetermined target range (Step S30). The "predetermined target range" is a target value of the proportion of the complementary cells masked by the unique ID generation circuit 20, and is a range having a predetermined width. This target range is a range in which the unique ID can be retrieved from the semiconductor device in a stable manner, and is determined in consideration of the temperature under which the semiconductor device is used, the voltage fluctuation, reading after a long retention time, etc. That is, while it is assumed that the unique ID can be retrieved in a stable manner, the target value of the unstable bit is determined in advance and the target range is determined.

When the proportion of the complementary cells in which the first and second data do not coincide with each other (the unstable bit rate) falls within a predetermined target range (Step S30: Yes), the data read out from the complementary cell determined to be the stable complementary cell in Step S28 is used as the unique ID (Step S31). Further, the determination result storage circuit 23 shown in FIG. 1 stores the address information on the complementary cell that has been determined to be the unstable complementary cell in Step S29 (Step S32). The unique ID generation circuit 20 is able to generate the unique ID without using the complementary cell 11 that corresponds to the address information stored in the determination result storage circuit 23 (i.e., the unstable complementary cell with a low reliability) when the next unique ID is generated.

On the other hand, when the proportion of the complementary cells in which the first and second data do not coincide with each other (the unstable bit rate) does not fall within the predetermined target range (Step S30: No), the unique ID generation circuit 20 adjusts the absolute value of the offset amount when the initial threshold voltages of the memory cells MC1 and MC2 have been virtually offset (Step S33).

Specifically, when the proportion of the complementary cells in which the first and second data do not coincide with each other is larger than the predetermined target range (i.e., when the number of unstable bits that have been masked is large), the unique ID generation circuit 20 reduces the absolute value of the offset amount when the initial threshold voltages Vt1 and Vt2 of the memory cells MC1 and MC2 are virtually offset. Accordingly, the conditions when the complementary cell is masked are relieved and the number of unstable complementary cells (the unstable bits) masked by the unique ID generation circuit 20 can be reduced. Accordingly, it is possible to prevent the unique ID generation circuit 20 from masking the complementary cells more than necessary.

In the configuration examples shown in FIGS. 1 and 8, for example, the voltage supplied to the gate of each of the transistors Tr1 and Tr2 is reduced. It is therefore possible to reduce the amount of the current drawn out from the bit lines BL1 and BL2 and to reduce the offset amount of the initial threshold voltages Vt1 and Vt2 of the memory cells MC1 and MC2.

Further, in the configuration examples shown in FIGS. 13 and 14, for example, the voltage supplied to the gate of each of the transistors Tr11 and Tr12 is reduced. Accordingly, it is possible to reduce the amount of the current supplied to the bit lines BL1 and BL2 from the constant current source 61, thereby reducing the offset amount of the initial threshold voltages Vt1 and Vt2 of the memory cells MC1 and MC2.

Further, when the proportion of the complementary cells in which the first and second data do not coincide with each other is smaller than the predetermined target range (i.e., when the number of unstable bits that have been masked is small), the unique ID generation circuit 20 increases the absolute value of the offset amount when the initial threshold voltages Vt1 and Vt2 of the memory cells MC1 and MC2 are virtually offset. Accordingly, the conditions when the complementary cells are masked become severe, and the number of unstable complementary cells (the unstable bits) masked by the unique ID generation circuit 20 can be increased. Accordingly, the reliability of the unique ID generated in the unique ID generation circuit 20 can be improved.

For example, in the configuration examples shown in FIGS. 1 and 8, the voltage supplied to the gate of each of the transistors Tr1 and Tr2 is increased. It is therefore possible to increase the amount of the current drawn out from the bit lines BL1 and BL2, whereby it is possible to increase the offset amount of the initial threshold voltages Vt1 and Vt2 of the memory cells MC1 and MC2.

Further, in the configuration examples shown in FIGS. 13 and 14, for example, the voltage supplied to the gate of each of the transistors Tr11 and Tr12 is increased. Accordingly, it is possible to increase the amount of the current supplied to the bit lines BL1 and BL2 from the constant current source 61, whereby it is possible to increase the offset amount of the initial threshold voltages Vt1 and Vt2 of the memory cells MC1 and MC2.

As described above, in the semiconductor device according to this embodiment, the proportion of the complementary cells to be masked can be set within a predetermined target range. Accordingly, it is possible to optimize the proportion of the complementary cells to be masked. Accordingly, it is possible to prevent the complementary cells from being masked more than necessary while improving the reliability of the unique ID to be generated. It is therefore possible to efficiently generate the unique ID.

Third Embodiment

Figure 16A:
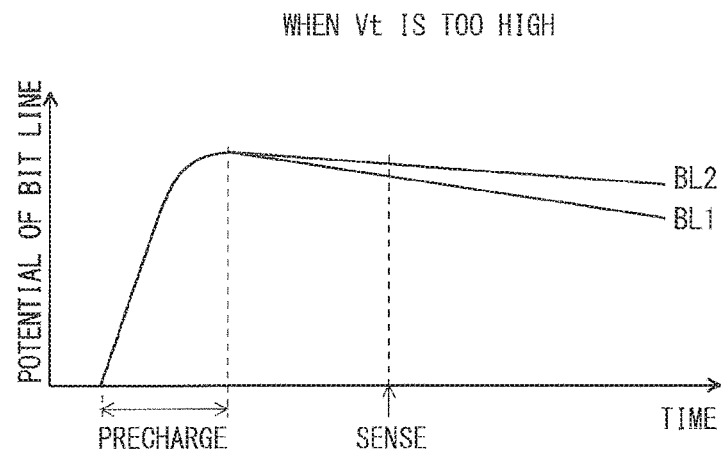
FIG. 16A is a diagram showing changes in the potential of a bit line with time.
Figure 16B:
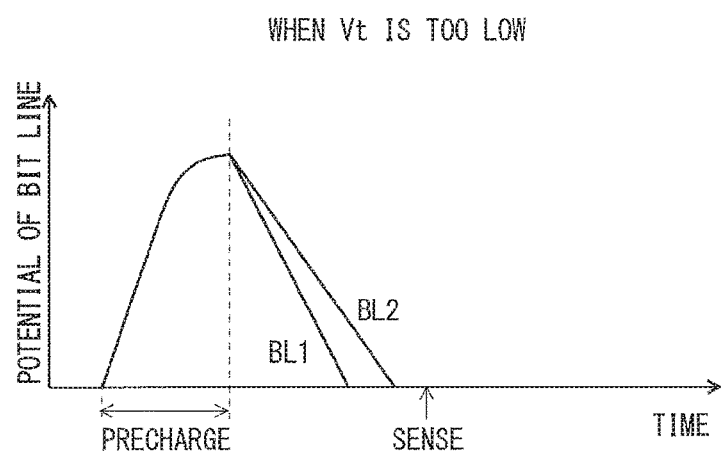
FIG. 16B is a diagram showing changes in the potential of the bit line with time.

Next, a third embodiment will be explained.
FIGS. 16A and 16B are diagrams showing changes in the potential of the bit line with time. As shown in FIG. 16A, when the initial threshold voltage Vt of the memory cell is too high, the amount of the current that flows between the source and the drain of the memory cell is small. In this case, after the bit line is precharged, the potential of the bit line is gradually reduced. Therefore, when, for example, the potential difference between the bit lines BL1 and BL2 is detected at the sense timing shown in FIG. 16A, the data in the complementary cell may be indefinite since the potential difference between the bit lines is small.

On the other hand, as shown in FIG. 16B, when the initial threshold voltage Vt of the memory cell is too low, the amount of the current that flows between the source and the drain of the memory cell is large. In this case, after the bit line is precharged, the potential of the bit line is suddenly reduced. Therefore, when the potential difference between the bit lines BL1 and BL2 is detected at the sense timing shown in FIG. 16B, for example, since the potential of the bit line is completely lowered, the data in the complementary cell may become indefinite without being able to detect the potential difference of the bit line.

In this embodiment, the semiconductor device capable of masking the unstable complementary cell (the unstable bit) even when the initial threshold voltage Vt is outside the appropriate range will be explained. In the following description, two methods: (1) a method of adjusting the voltage level of the memory gate MG and (2) a method of adjusting the sense timing, will be explained. Since the other configurations are similar to those of the semiconductor devices described in the first and second embodiments, overlapping descriptions will be omitted as appropriate.

(1) Method of Adjusting Voltage Level of Memory Gate MG

In the memory cells MC1 and MC2 shown in FIG. 2, by adjusting the voltage $V_{MG}$ applied to the memory gate MG, the threshold voltage Vt of the memory cell can be adjusted. Specifically, the property of the threshold voltage Vt that it is reduced as the voltage $V_{MG}$ applied to the memory gate MG becomes higher and it is increased as the voltage $V_{MG}$ applied to the memory gate MG becomes lower is used.

When, for example, the unique ID generation circuit 20 shown in FIG. 1 adjusts the voltage $V_{MG}$ applied to the memory gate MG, the unique ID generation circuit 20 sends an instruction to the memory control circuit 40 to cause the memory control circuit 40 to adjust the voltage $V_{MG}$ of the memory gate MG. When the memory control circuit 40 receives the instruction to adjust the voltage $V_{MG}$ of the memory gate MG from the unique ID generation circuit 20, the memory control circuit 40 applies a predetermined voltage $V_{MG}$ to the memory gate MG of the memory cell array 10.

Figure 17:
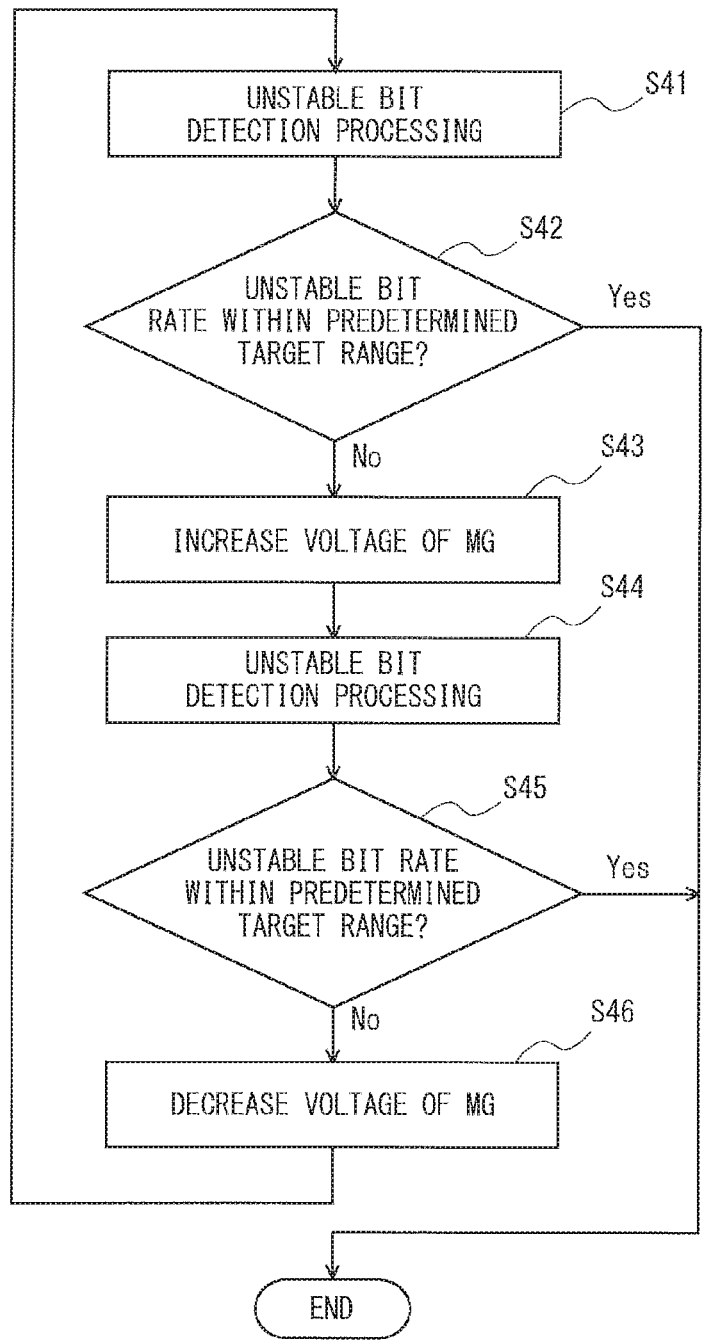
FIG. 17 is a flowchart for describing one example of an operation of a semiconductor device according to a third embodiment.

FIG. 17 is a flowchart for describing one example of operations of the semiconductor device according to this embodiment. In the memory cell that has been manufactured, the value of the initial threshold voltage Vt is unknown. Therefore, in this embodiment, as shown in FIG. 17, the unstable bit detection processing described in the first embodiment (specifically, the processing of Steps S1-S7 shown in FIG. 9) is executed on the memory cell that has been manufactured (Step S41).

It is then determined whether the proportion of the unstable complementary cells (the unstable bit rate) falls within the predetermined target range (Step S42). When the proportion of the unstable complementary cells (the unstable bit rate) falls within the predetermined target range (Step S42: Yes), the processing shown in FIG. 17 is ended.

On the other hand, when the proportion of the unstable complementary cells (the unstable bit rate) does not fall within the predetermined target range (Step S42: No), the unique ID generation circuit 20 increases the voltage $V_{MG}$ of the memory gate MG (Step S43).

After that, in the state in which the voltage $V_{MG}$ of the memory gate MG is increased, the unstable bit detection processing described in the first embodiment (specifically, the processing of Steps S1-S7 shown in FIG. 9) is executed again (Step S44).

It is then determined whether the proportion of the unstable complementary cells (the unstable bit rate) falls within the predetermined target range (Step S45). When the proportion of the unstable complementary cells (the unstable bit rate) falls within the predetermined target range (Step S45: Yes), the processing shown in FIG. 17 is ended. The unique ID generation circuit 20 stores the voltage $V_{MG}$ of the memory gate MG at this time. In the following process, when the unique ID is generated, this voltage $V_{MG}$ that has been stored is applied to the memory gate MG to generate the unique ID.

On the other hand, when the proportion of the unstable complementary cells (the unstable bit rate) does not fall within the predetermined target range (Step S45: No), the unique ID generation circuit 20 reduces the voltage $V_{MG}$ of the memory gate MG (Step S46). After that, the unstable bit detection processing described in the first embodiment (specifically, processing of Steps S1-S7 shown in FIG. 9) is executed again (Step S41).

It is then determined whether the proportion of the unstable complementary cells (the unstable bit rate) falls within the predetermined target range (Step S42). When the proportion of the unstable complementary cells (the unstable bit rate) falls within the predetermined target range (Step S42: Yes), the processing shown in FIG. 17 is ended. The unique ID generation circuit 20 stores the voltage $V_{MG}$ of the memory gate MG at this time. In the following process, when the unique ID is generated, this voltage $V_{MG}$ that has been stored is applied to the memory gate MG to generate the unique ID.

On the other hand, when the proportion of the unstable complementary cells (the unstable bit rate) does not fall within the predetermined target range (Step S42: No), the unique ID generation circuit 20 again increases the voltage $V_{MG}$ of the memory gate MG (Step S43). After that, the processing of Steps S41-S46 in FIG. 17 (i.e., the increase/decrease in the voltage $V_{MG}$ of the memory gate MG) is repeated until that the proportion of the unstable complementary cells (the unstable bit rate) falls within the predetermined target range.

In the memory cell that has been manufactured, it is not clear whether the memory cell has become indefinite since the initial threshold voltage Vt is too high or the memory cell has become indefinite since the initial threshold voltage Vt is too low. Therefore, in the processing described above, after the voltage $V_{MG}$ of the memory gate MG is increased first in Step S43, the voltage $V_{MG}$ of the memory gate MG is reduced in Step S46 to check the change in the unstable bit rate.

In the processing shown in FIG. 17, the case in which the voltage $V_{MG}$ of the memory gate MG is first increased and the voltage $V_{MG}$ of the memory gate MG is then reduced has been described. However, in this embodiment, the voltage $V_{MG}$ of the memory gate MG may be reduced first and the voltage $V_{MG}$ of the memory gate MG may then be increased.

Figure 18A:
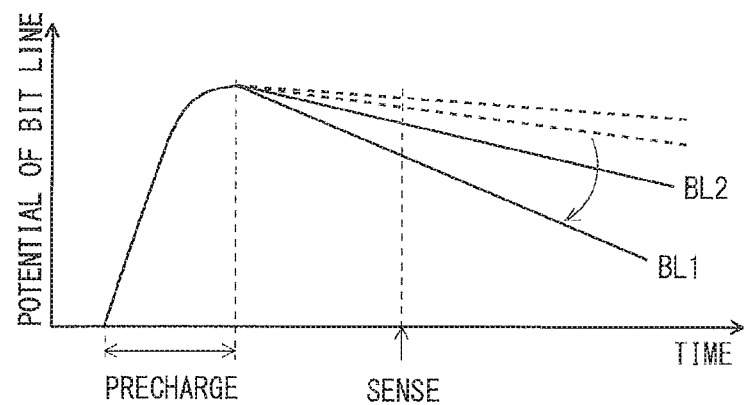
FIG. 18A is a diagram showing changes in the potential of a bit line with time.

In the semiconductor device according to this embodiment described above, the initial threshold voltage Vt of the memory cell is adjusted by adjusting the voltage $V_{MG}$ applied to the memory gate MG. Specifically, as shown in FIG. 18A, when the initial threshold voltage Vt of the memory cell is too high, the amount of the current that flows between the source and the drain of the memory cell is small. In this case, after the bit line is precharged, the potential of the bit line is gradually reduced (see dashed lines shown in FIG. 18A). Therefore, when the potential difference between the bit lines BL1 and BL2 is detected at one sense timing, the data in the complementary cell may become indefinite since the potential difference between the bit lines is small. On the other hand, in this embodiment, the initial threshold voltage Vt of the memory cell is adjusted to be low by increasing the voltage $V_{MG}$ applied to the memory gate MG (see solid lines in FIG. 18A). Accordingly, the initial threshold voltage Vt of the memory cell can be adjusted to an appropriate range, whereby it is possible to suitably mask the unstable complementary cell (the unstable bit).

Figure 18B:
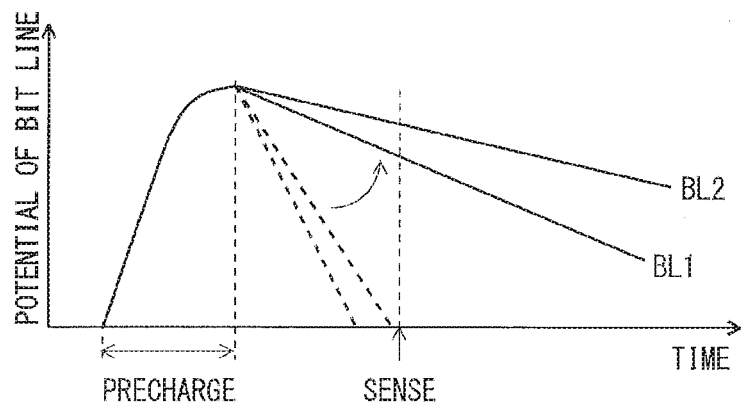
FIG. 18B is a diagram showing changes in the potential of the bit line with time.

Further, as shown in FIG. 18B, when the initial threshold voltage Vt of the memory cell is too low, the amount of the current that flows between the source and the drain of the memory cell is large. In this case, after the bit line is precharged, the potential of the bit line is suddenly reduced (see dashed lines shown in FIG. 18B). Therefore, when the potential difference between the bit lines BL1 and BL2 is detected at the sense timing shown in FIG. 18B, since the potential of the bit line is completely lowered, the data in the complementary cell may become indefinite without being able to detect the potential difference of the bit line. On the other hand, in this embodiment, the initial threshold voltage Vt of the memory cell is adjusted to become high by decreasing the voltage $V_{MG}$ applied to the memory gate MG (see solid lines in FIG. 18B). Accordingly, the initial threshold voltage Vt of the memory cell can be adjusted to an appropriate range, whereby it is possible to suitably mask the unstable complementary cell (the unstable bit).

In this embodiment, the aforementioned processing is executed in advance before the unique ID generation processing is executed. Accordingly, even when the initial threshold voltage Vt of the memory cell is outside the appropriate range, it is possible to suitably mask the unstable complementary cell (the unstable bit).

(2) Method of Adjusting Sense Timing

Next, a method of adjusting the sense timing will be explained.

Figure 19:
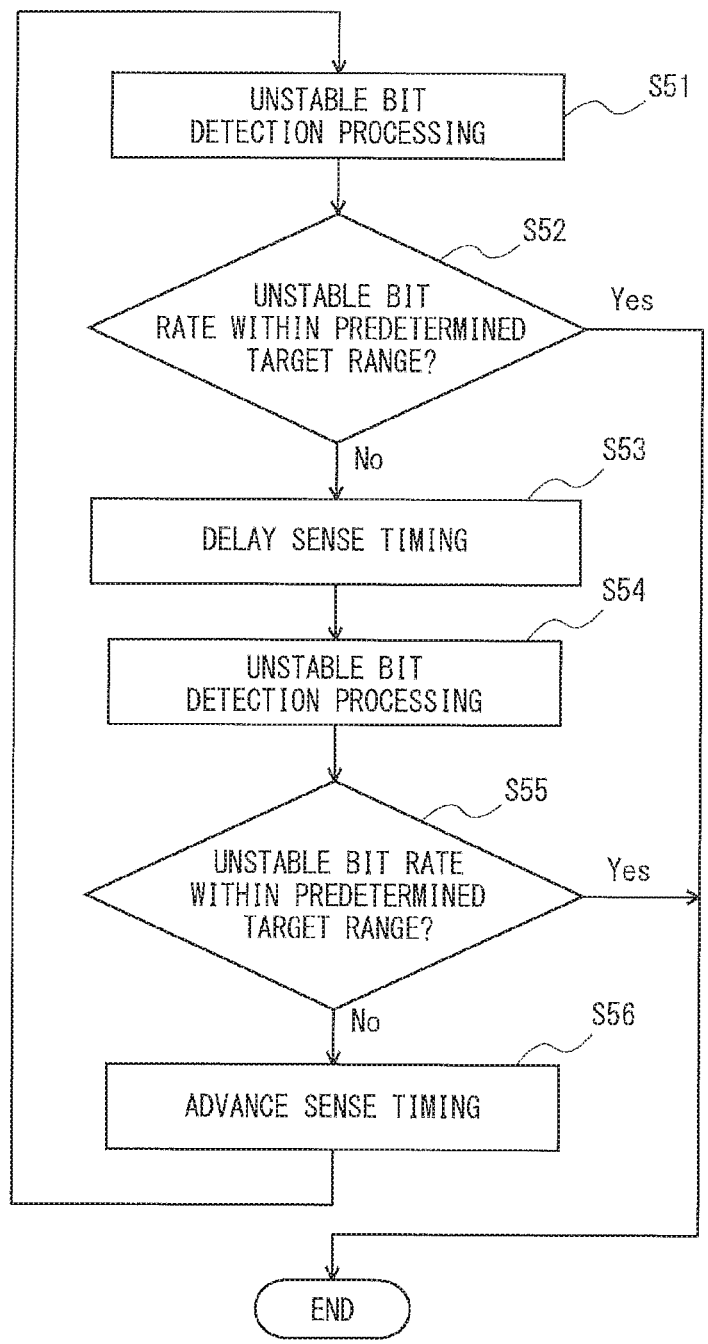
FIG. 19 is a flowchart for describing another example of the operation of the semiconductor device according to the third embodiment.

FIG. 19 is a flowchart for describing another example of the operation of the semiconductor device according to this embodiment. In the memory cell that has been manufactured, the value of the initial threshold voltage Vt is unknown. Therefore, in this embodiment, as shown in FIG. 19, the unstable bit detection processing described in the first embodiment (specifically, the processing of Steps S1-S7 shown in FIG. 9) is executed first for the memory cell that has been manufactured (Step S51).

It is then determined whether the proportion of the unstable complementary cells (the unstable bit rate) is within the predetermined target range (Step S52). When the proportion of the unstable complementary cells (the unstable bit rate) falls within the predetermined target range (Step S52: Yes), the processing shown in FIG. 19 is ended.

On the other hand, when the proportion of the unstable complementary cells (the unstable bit rate) does not fall within the predetermined target range (Step S52: No), the unique ID generation circuit 20 delays the timing of reading the data in the complementary cell using the sense amplifier SA (Step S53).

After that, the unstable bit detection processing described in the first embodiment (specifically, the processing of Steps S1-S7 shown in FIG. 9) is executed again (Step S54). In this case, the data in the complementary cell is read out at the timing set in Step S53, that is, by delaying the timing of reading out the data.

It is then determined whether the proportion of the unstable complementary cells (the unstable bit rate) falls within the predetermined target range (Step S55). When the proportion of the unstable complementary cells (the unstable bit rate) falls within the predetermined target range (Step S55: Yes), the processing shown in FIG. 19 is ended. The unique ID generation circuit 20 stores the timing of reading the sense amplifier SA at this time, and generates the unique ID using the timing of reading the sense amplifier SA that has been stored when the next unique ID is generated.

On the other hand, when the proportion of the unstable complementary cells (the unstable bit rate) does not fall within the predetermined target range (Step S55: No), the unique ID generation circuit 20 advances the timing of reading out the data in the complementary cell using the sense amplifier SA (Step S56). After that, the unstable bit detection processing described in the first embodiment (specifically, the processing of Steps S1-S7 shown in FIG. 9) is executed again (Step S51). In this case, the data in the complementary cell is read out at the timing set in Step S56, that is, by advancing the timing of reading out the data.

It is then determined whether the proportion of the unstable complementary cells (the unstable bit rate) falls within the predetermined target range (Step S52). When the proportion of the unstable complementary cells (the unstable bit rate) falls within the predetermined target range (Step S52: Yes), the processing shown in FIG. 19 is ended. The unique ID generation circuit 20 stores the timing of reading the sense amplifier SA at this time, and generates the unique ID using the timing of reading the sense amplifier SA that has been stored when the next unique ID is generated.

On the other hand, when the proportion of the unstable complementary cells (the unstable bit rate) does not fall within the predetermined target range (Step S52: No), the unique ID generation circuit 20 again delays the timing of reading out the data in the complementary cell using the sense amplifier SA (Step S53). After that, the processing of Steps S51-S56 in FIG. 19 (i.e., the processing of delaying the timing of reading the sense amplifier SA and the processing of advancing the same) is repeated until that the proportion of the unstable complementary cells (the unstable bit rate) falls within the predetermined target range.

In the memory cell that has been manufactured, it is not clear whether the memory cell has become indefinite since the initial threshold voltage Vt is too high or it has become indefinite since the initial threshold voltage Vt is too low. Therefore, in the processing described above, after the processing of delaying the timing of reading the sense amplifier SA is first executed in Step S53, the processing of advancing the timing of reading the sense amplifier SA is executed in Step S56 to check the change in the unstable bit rate.

In the processing shown in FIG. 19, the case in which the timing of reading the sense amplifier SA is first delayed and the timing of reading the sense amplifier SA is then advanced has been described. However, in this embodiment, the timing of reading the sense amplifier SA may be advanced first, and then the timing of reading the sense amplifier SA may be delayed.

Figure 20A:
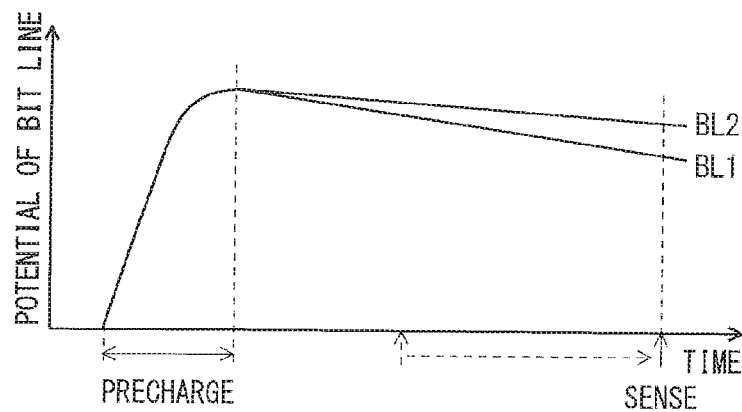
FIG. 20A is a diagram showing changes in the potential of the bit line with time.

As shown in FIG. 20A, when the initial threshold voltage Vt of the memory cell is too high, the amount of the current that flows between the source and the drain of the memory cell is small. In this case, after the bit line is precharged, the potential of the bit line is gradually reduced. Therefore, when the potential difference between the bit lines BL1 and BL2 is detected at the sense timing shown by dashed lines in FIG. 20A, the data in the complementary cell may become indefinite since the potential difference between the bit lines is small. On the other hand, in this embodiment, as shown in solid lines of FIG. 20A, the timing of reading the sense amplifier SA is delayed. Accordingly, the potential difference between the bit lines detected by the sense amplifier SA becomes the potential difference with which the data can be read out, whereby it is possible to appropriately read out the data in the complementary cell.

Figure 20B:
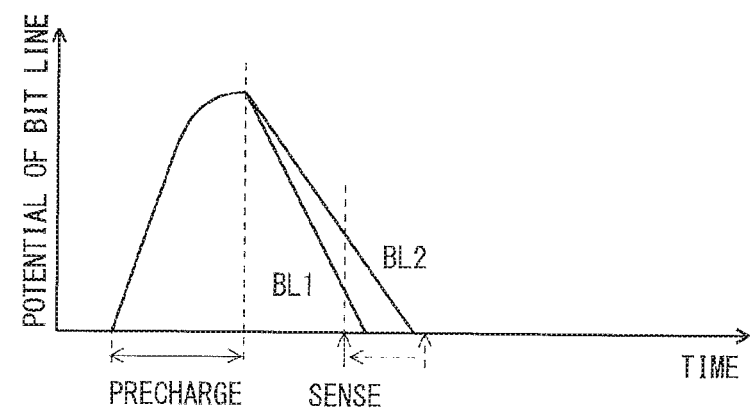
FIG. 20B is a diagram showing changes in the potential of the bit line with time.

Further, as shown in FIG. 20B, when the initial threshold voltage Vt of the memory cell is too low, the amount of the current that flows between the source and the drain of the memory cell is large. In this case, after the bit line is precharged, the potential of the bit line is suddenly reduced. Therefore, when the potential difference between the bit lines BL1 and BL2 is detected at the sense timing shown by dashed lines in FIG. 20B, since the potential of the bit line is completely lowered, the data in the complementary cell may become indefinite without being able to detect the potential difference of the bit line. On the other hand, in this embodiment, as shown in solid lines in FIG. 20B, the timing of reading the sense amplifier SA is advanced. Therefore, the potential difference between the bit lines detected by the sense amplifier SA becomes the potential difference with which the data can be read out, whereby it is possible to appropriately read out the data in the complementary cell.

In this embodiment, the aforementioned processing is executed in advance before the unique ID generation processing is executed. Accordingly, even when the initial threshold voltage Vt of the memory cell is outside the appropriate range, it is possible to suitably mask the unstable complementary cell (the unstable bit).

The first to third embodiments can be combined as desirable by one of ordinary skill in the art.

While the disclosure has been described in terms of several embodiments, those skilled in the art will recognize that the disclosure can be practiced with various modifications within the spirit and scope of the appended claims and the disclosure is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a memory array comprising a plurality of complementary cells, each of which comprises a first memory cell and a second memory cell, the memory array being capable of holding data in the complementary cells using a difference between a threshold voltage of the first memory cell and a threshold voltage of the second memory cell; and
a unique ID generation circuit configured to generate an ID specific to the memory array using an initial threshold voltage of the first memory cell and an initial threshold voltage of the second memory cell, wherein the unique ID generation circuit performs the following processing of:
reading out data in the complementary cell as first data in a first state in which the initial threshold voltage of the first memory cell has been virtually offset;
reading out data in the complementary cell as second data in a second state in which the initial threshold voltage of the second memory cell has been virtually offset; and
using the data in the complementary cell as the unique ID when the first data in the complementary cell read out in the first state and the second data in the complementary cell read out in the second state coincide with each other.

2. The semiconductor device according to claim 1, wherein the unique ID generation circuit comprises a determination result storage circuit configured to store a result of a determination regarding whether the first data in the complementary cell read out in the first state and the second data in the complementary cell read out in the second state have coincided with each other.

3. The semiconductor device according to claim 2, wherein
the determination result storage circuit stores address information on a complementary cell in which the first data in the complementary cell read out in the first state and the second data in the complementary cell read out in the second state have coincided with each other, and
the unique ID generation circuit generates, when the next unique ID is generated, the unique ID using a complementary cell that corresponds to the address information stored in the determination result storage circuit.

4. The semiconductor device according to claim 2, wherein
the determination result storage circuit stores address information on a complementary cell in which the first data in the complementary cell read out in the first state and the second data in the complementary cell read out in the second state have not coincided with each other, and
the unique ID generation circuit generates, when the next unique ID is generated, the unique ID without using a complementary cell that corresponds to the address information stored in the determination result storage circuit.

5. The semiconductor device according to claim 1, wherein
the unique ID generation circuit reads out the data in the complementary cell as the first data in the first state in which the initial threshold voltage of the first memory cell has been virtually reduced, and
the unique ID generation circuit reads out the data in the complementary cell as the second data in the second state in which the initial threshold voltage of the second memory cell has been virtually reduced.

6. The semiconductor device according to claim 5, wherein
the memory array further comprises:
a first bit line connected to the first memory cell;

a second bit line connected to the second memory cell; and a sense amplifier connected to the first bit line and the second bit line, the unique ID generation circuit virtually reduces the initial threshold voltage of the first memory cell using a first current drawing circuit that draws out current from the first bit line, and the unique ID generation circuit virtually reduces the initial threshold voltage of the second memory cell using a second current drawing circuit that draws out current from the second bit line.

7. The semiconductor device according to claim 1, wherein the unique ID generation circuit reads out the data in the complementary cell as the first data in the first state in which the initial threshold voltage of the first memory cell has been virtually increased, and the unique ID generation circuit reads out the data in the complementary cell as the second data in the second state in which the initial threshold voltage of the second memory cell has been virtually increased.

8. The semiconductor device according to claim 7, wherein the memory array further comprises:
a first bit line connected to the first memory cell;
a second bit line connected to the second memory cell; and a sense amplifier connected to the first bit line and the second bit line, the unique ID generation circuit virtually increases the initial threshold voltage of the first memory cell using a first current supply circuit that supplies current to the first bit line, and the unique ID generation circuit virtually increases the initial threshold voltage of the second memory cell using a second current supply circuit that supplies current to the second bit line.

9. The semiconductor device according to claim 1, wherein the memory array comprises a complementary cell for data holding and a complementary cell for unique ID generation as the plurality of complementary cells, and the unique ID generation circuit generates the unique ID using the complementary cell for unique ID generation.

10. The semiconductor device according to claim 9, further comprising a memory control circuit configured to control data writing to and data reading from the plurality of complementary cells, wherein the memory control circuit switches, when the first and second data in the complementary cell have not coincided with each other at the time of generating the unique ID in the unique ID generation circuit, the complementary cell in which the first and second data have not coincided with each other from the complementary cell for unique ID generation to the complementary cell for data holding.

11. The semiconductor device according to claim 1, wherein the unique ID generation circuit determines whether the proportion of the complementary cells in which the first and second data do not coincide with each other with respect to the complementary cells in which the first and second data coincide with each other falls within a predetermined target range.

12. The semiconductor device according to claim 11, wherein the unique ID generation circuit reduces, when the proportion of the complementary cells in which the first and second data do not coincide with each other is larger than the predetermined target range, an absolute value of an offset amount when initial threshold voltages of the first and second memory cells have been virtually offset.

13. The semiconductor device according to claim 11, wherein the unique ID generation circuit increases, when the proportion of the complementary cells in which the first and second data do not coincide with each other is smaller than the predetermined target range, an absolute value of an offset amount when initial threshold voltages of the first and second memory cells have been virtually offset.

14. The semiconductor device according to claim 1, wherein the first and second memory cells are split gate flash memory cells, and the unique ID generation circuit applies a predetermined voltage to memory gates of the first and second memory cells to adjust the initial threshold voltages of the first and second memory cells.

15. The semiconductor device according to claim 1, wherein the memory array further comprises:
a first bit line connected to the first memory cell;
a second bit line connected to the second memory cell; and a sense amplifier connected to the first bit line and the second bit line, and the unique ID generation circuit adjusts a timing of reading out the first and second data in the complementary cell in the first and second states using the sense amplifier.

16. A unique ID generation method that generates a unique ID using a memory array comprising a plurality of complementary cells, each of the complementary cells includes a first memory cell and a second memory cell, the method comprising:

reading out data in the complementary cell as first data in a first state in which an initial threshold voltage of the first memory cell has been virtually offset;

reading out data in the complementary cell as second data in a second state in which an initial threshold voltage of the second memory cell has been virtually offset; and using the data in the complementary cell as the unique ID when the first data in the complementary cell read out in the first state and the second data in the complementary cell read out in the second state coincide with each other.

* * * * *